US012584800B2

(12) United States Patent
Kim et al.

(10) Patent No.: US 12,584,800 B2
(45) Date of Patent: Mar. 24, 2026

(54) DIGITAL TEMPERATURE SENSOR AND METHOD OF MEASURING TEMPERATURE

(71) Applicant: SAMSUNG ELECTRONICS CO., LTD., Suwon-si (KR)

(72) Inventors: Hanseul Kim, Suwon-si (KR); Seongjin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

(21) Appl. No.: 18/216,913

(22) Filed: Jun. 30, 2023

(65) Prior Publication Data

US 2024/0142316 A1     May 2, 2024

(30) Foreign Application Priority Data

Oct. 31, 2022     (KR) ........................ 10-2022-0142439

(51) Int. Cl.
*G01K 7/16*          (2006.01)
(52) U.S. Cl.
CPC ........... *G01K 7/16* (2013.01); *G01K 2219/00* (2013.01)
(58) Field of Classification Search
CPC ...... G01K 7/16; G01K 2219/00; G01K 7/015; G01K 7/42; G01K 15/005; G01K 7/01; G01K 15/00
See application file for complete search history.

(56) References Cited

U.S. PATENT DOCUMENTS

| | | | |
|---|---|---|---|
| 7,135,909 B1 * | 11/2006 | Willis | ...................... G01K 7/01 |
| | | | 327/512 |
| 7,581,881 B2 | 9/2009 | Kim et al. | |
| 8,931,953 B2 | 1/2015 | Law et al. | |
| 9,397,661 B2 | 7/2016 | Ha | |
| 9,525,424 B2 * | 12/2016 | Tung | .................... H03K 3/0315 |
| 9,998,124 B2 | 6/2018 | Calhoun et al. | |

(Continued)

FOREIGN PATENT DOCUMENTS

| | | | | |
|---|---|---|---|---|
| CN | 109489844 A | * | 3/2019 | ............... G11C 7/04 |
| DE | 102007002253 A1 | * | 7/2007 | ............... G01K 7/32 |

(Continued)

*Primary Examiner* — Laura Martin
*Assistant Examiner* — Julia Fitzpatrick
(74) *Attorney, Agent, or Firm* — Sughrue Mion, PLLC

(57)          ABSTRACT
A digital temperature sensor includes a current generation circuit, an oscillation circuit, a conversion circuit and a calculation circuit. The current generation circuit generates a proportional to absolute temperature (PTAT) current and a complementary to absolute temperature (CTAT) current. The oscillation circuit generates a first clock signal having a first cyclic period based on the PTAT current and generates a second clock signal having a second cyclic period based on the CTAT current. The conversion circuit generates a first temperature code based on the first clock signal such that the first temperature code decreases as the operation temperature increases and generates a second temperature code based on the second clock signal such that the second temperature code increases as the operation temperature increases. The calculation circuit calculates a difference between the first temperature code and the second temperature code and generates a corrected temperature code based on the difference.

20 Claims, 19 Drawing Sheets

(56)       References Cited

U.S. PATENT DOCUMENTS

| | | |
|---|---|---|
| 10,260,957 B2 | 4/2019 | Ma et al. |
| 10,473,530 B2 | 11/2019 | Fan et al. |
| 10,763,830 B2 | 9/2020 | Delshadpour et al. |
| 11,233,503 B2 | 1/2022 | Azam et al. |
| 2010/0301832 A1* | 12/2010 | Katyal ...................... G05F 3/30 |
| | | 323/314 |
| 2021/0263549 A1* | 8/2021 | Kanoun ................... G05F 3/30 |
| 2021/0397362 A1 | 12/2021 | Kim et al. |

FOREIGN PATENT DOCUMENTS

| | | | | |
|---|---|---|---|---|
| JP | 2013-205085 A | | 10/2013 | |
| KR | 100674974 B1 | * | 1/2007 | .............. G05F 3/30 |
| KR | 10-0800470 B1 | | 2/2008 | |
| KR | 100843226 B1 | * | 7/2008 | ....... G11C 11/40615 |
| KR | 20220135684 A | * | 10/2022 | .............. G01K 7/34 |
| TW | I313458 B | * | 8/2009 | ............ E01D 21/00 |
| TW | 201639291 A | * | 11/2016 | |

* cited by examiner

FIG. 2

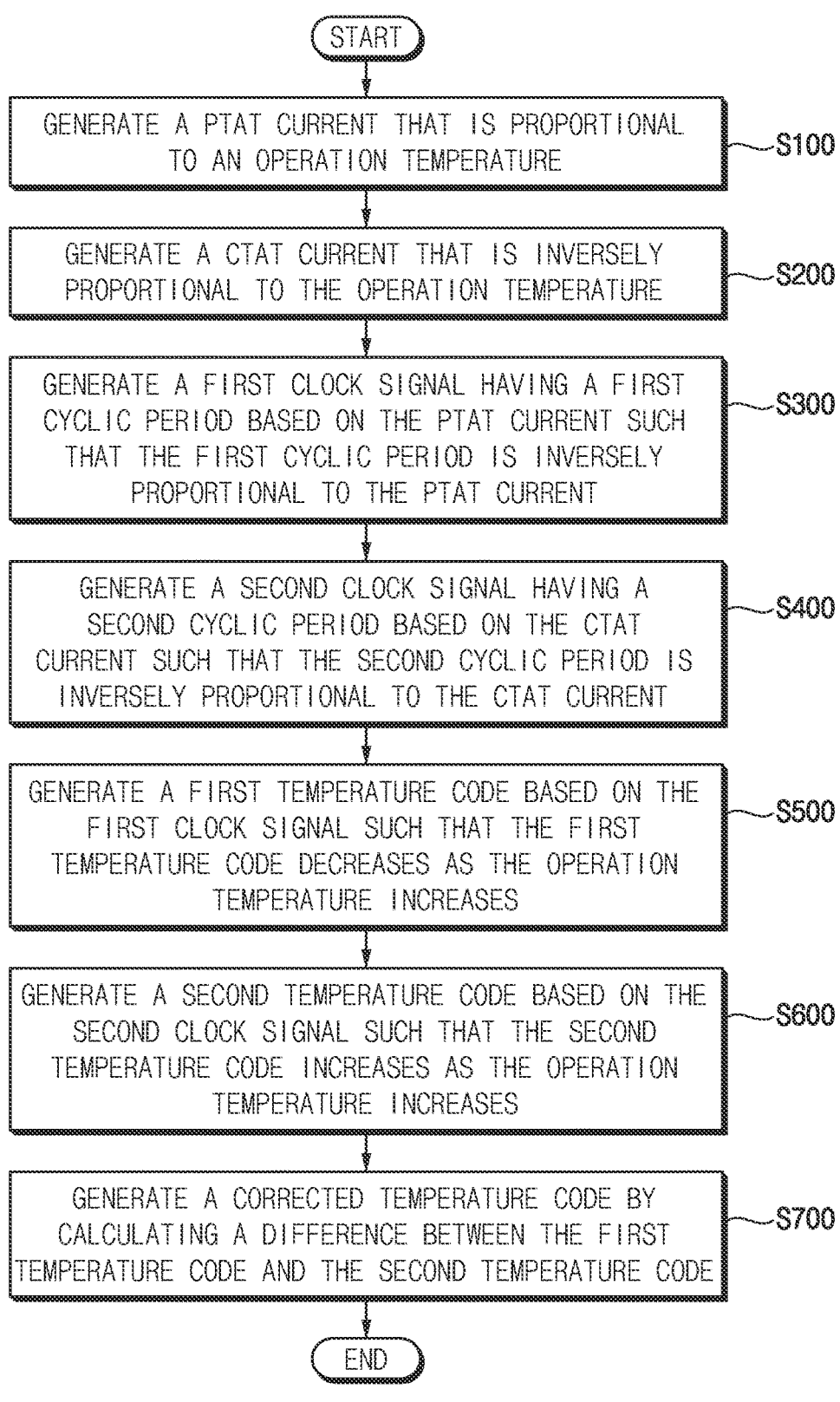

START

GENERATE A PTAT CURRENT THAT IS PROPORTIONAL TO AN OPERATION TEMPERATURE ⟶ S100

GENERATE A CTAT CURRENT THAT IS INVERSELY PROPORTIONAL TO THE OPERATION TEMPERATURE ⟶ S200

GENERATE A FIRST CLOCK SIGNAL HAVING A FIRST CYCLIC PERIOD BASED ON THE PTAT CURRENT SUCH THAT THE FIRST CYCLIC PERIOD IS INVERSELY PROPORTIONAL TO THE PTAT CURRENT ⟶ S300

GENERATE A SECOND CLOCK SIGNAL HAVING A SECOND CYCLIC PERIOD BASED ON THE CTAT CURRENT SUCH THAT THE SECOND CYCLIC PERIOD IS INVERSELY PROPORTIONAL TO THE CTAT CURRENT ⟶ S400

GENERATE A FIRST TEMPERATURE CODE BASED ON THE FIRST CLOCK SIGNAL SUCH THAT THE FIRST TEMPERATURE CODE DECREASES AS THE OPERATION TEMPERATURE INCREASES ⟶ S500

GENERATE A SECOND TEMPERATURE CODE BASED ON THE SECOND CLOCK SIGNAL SUCH THAT THE SECOND TEMPERATURE CODE INCREASES AS THE OPERATION TEMPERATURE INCREASES ⟶ S600

GENERATE A CORRECTED TEMPERATURE CODE BY CALCULATING A DIFFERENCE BETWEEN THE FIRST TEMPERATURE CODE AND THE SECOND TEMPERATURE CODE ⟶ S700

END

F I G. 5
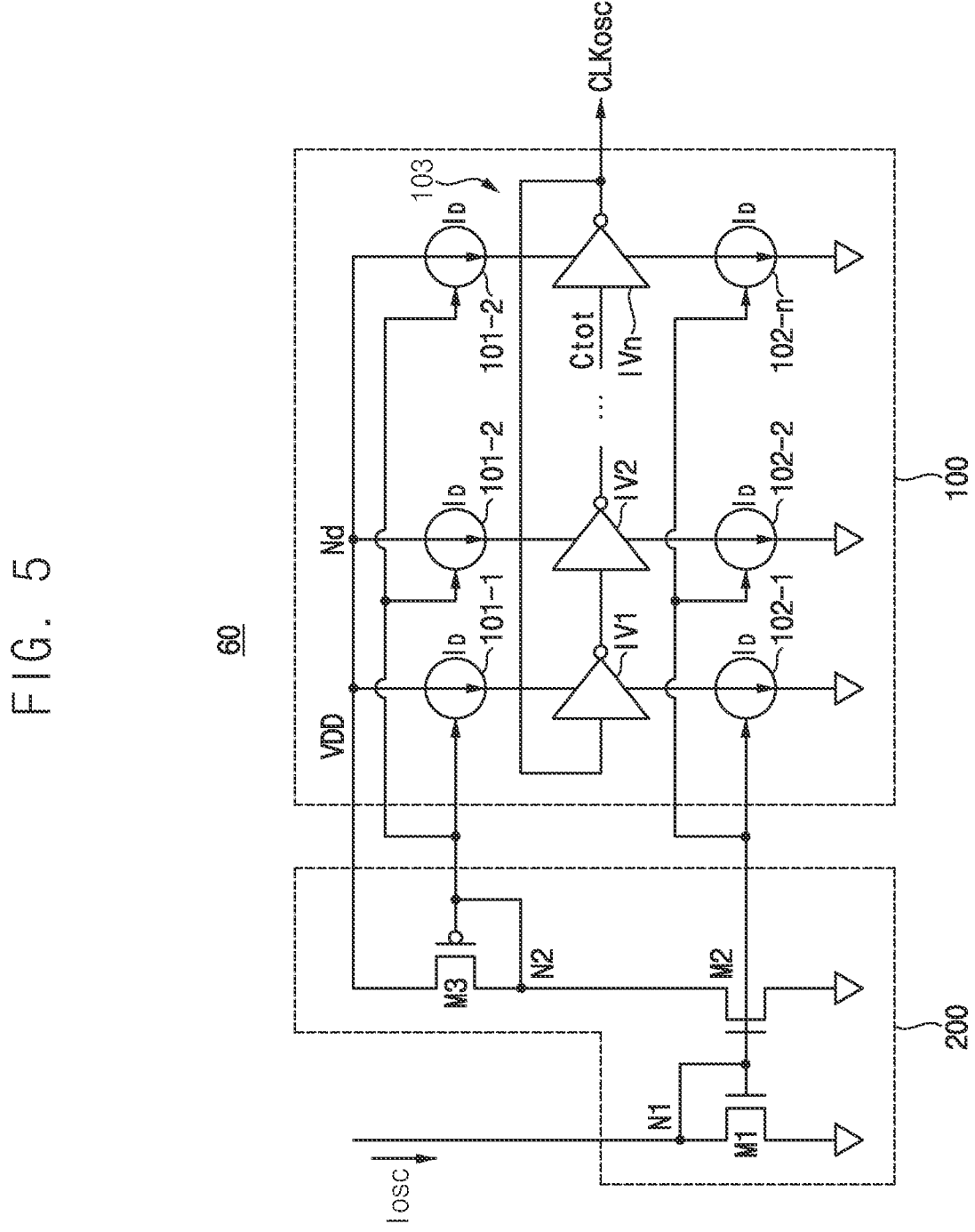

F I G . 1 1
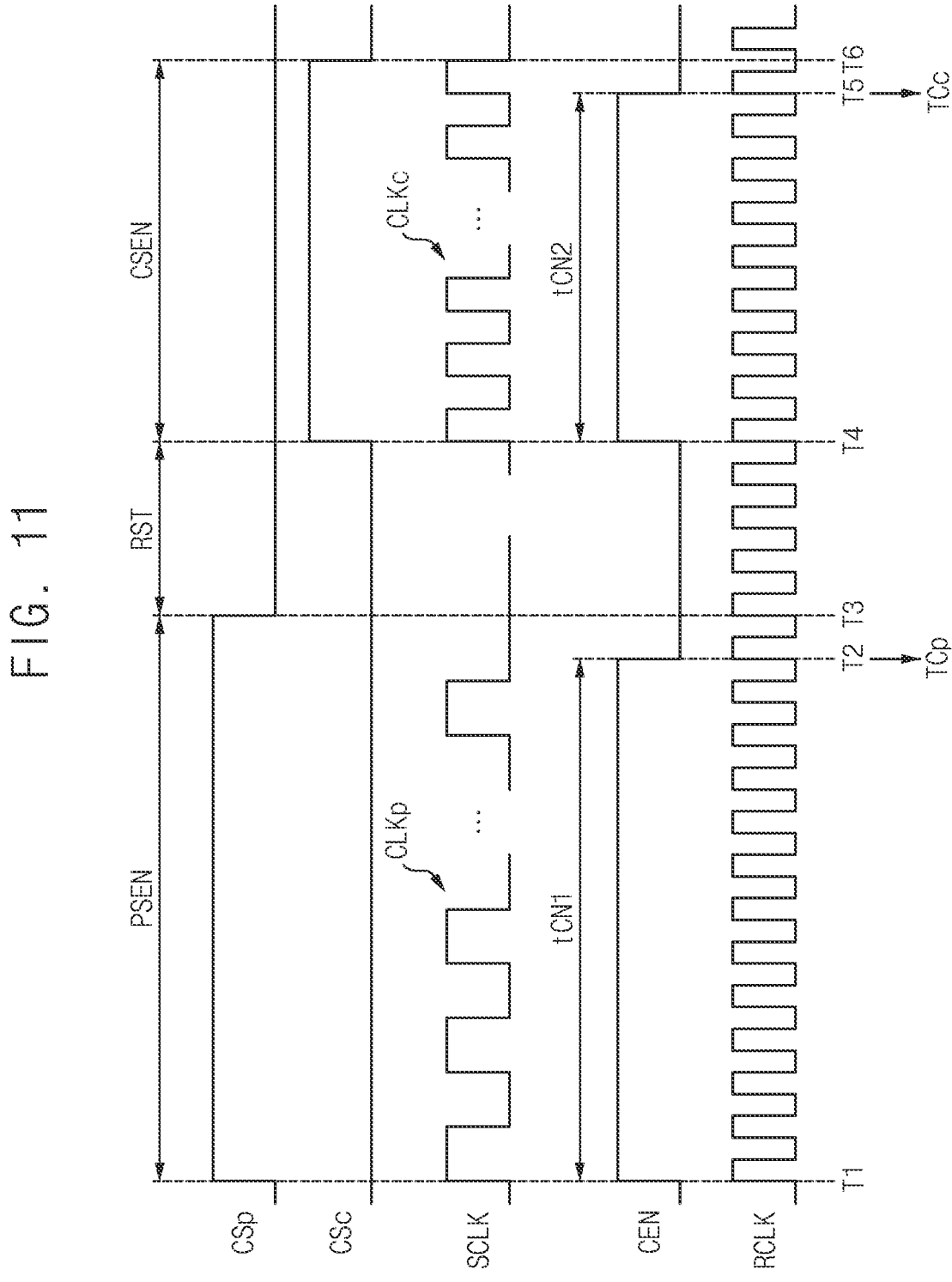

FIG. 22

DIGITAL TEMPERATURE SENSOR AND METHOD OF MEASURING TEMPERATURE

CROSS-REFERENCE TO RELATED APPLICATION

This U.S. non-provisional application claims priority under 35 USC § 119 to Korean Patent Application No. 10-2022-0142439, filed on Oct. 31, 2022, in the Korean Intellectual Property Office (KIPO), the disclosure of which is incorporated by reference herein in its entirety.

BACKGROUND

Example embodiments relate generally to semiconductor integrated circuits, and more particularly to a digital temperature sensor and a method of measuring temperature.

Since a semiconductor device includes a plurality of transistors, electrical characteristics may vary depending on an operation temperature. The semiconductor device may perform temperature compensation for an internal operation based on a measured temperature. When the temperature measurement accuracy is low, performance may be significantly degraded depending on the temperature sensitivity of the semiconductor device.

SUMMARY

Some example embodiments may provide a digital temperature sensor and a method of measuring temperature, capable of providing exact operation temperature information.

According to an aspect of one or more example embodiments, a digital temperature sensor includes a current generation circuit configured to generate a proportional to absolute temperature (PTAT) current that is proportional to an operation temperature and generate a complementary to absolute temperature (CTAT) current that is inversely proportional to the operation temperature; an oscillation circuit configured to generate a first clock signal having a first cyclic period based on the PTAT current such that the first cyclic period is inversely proportional to the PTAT current and generate a second clock signal having a second cyclic period based on the CTAT current such that the second cyclic period is inversely proportional to the CTAT current; a conversion circuit configured to generate a first temperature code based on the first clock signal such that the first temperature code decreases as the operation temperature increases and generate a second temperature code based on the second clock signal such that the second temperature code increases as the operation temperature increases; and a calculation circuit configured to calculate a difference between the first temperature code and the second temperature code and generate a corrected temperature code based on the difference.

According to another aspect of one or more example embodiments, a digital temperature sensor includes a current generation circuit configured to generate a proportional to absolute temperature (PTAT)current that is proportional to an operation temperature, generate a complementary to absolute temperature (CTAT)current that is inversely proportional to the operation temperature, and generate a reference current that is fixed regardless of the operation temperature; an oscillation circuit configured to generate a first clock signal having a first cyclic period based on the PTAT current, generate a second clock signal having a second cyclic period based on the CTAT current, and generate a reference clock signal having a reference cyclic period based on the reference current such that the first cyclic period is inversely proportional to the PTAT current, the second cyclic period is inversely proportional to the CTAT current, and the reference cyclic period is fixed regardless of the operation temperature; a conversion circuit configured to generate a first temperature code and a second temperature code based on the first clock signal, the second clock signal and the reference clock signal such that the first temperature code decreases as the operation temperature increases and the second temperature code increases as the operation temperature increases; and a calculation circuit configured to calculate a difference between the first temperature code and the second temperature code and generate a corrected temperature code based on the difference, such that the corrected temperature code decreases as the operation temperature decreases.

According to yet another aspect of one or more example embodiments, a method includes generating a proportional to absolute temperature (PTAT)current that is proportional to an operation temperature; generating a complementary to absolute temperature (CTAT)current that is inversely proportional to the operation temperature; generating a first clock signal having a first cyclic period based on the PTAT current such that the first cyclic period is inversely proportional to the PTAT current; generating a second clock signal having a second cyclic period based on the CTAT current such that the second cyclic period is inversely proportional to the CTAT current; generating a first temperature code based on the first clock signal such that the first temperature code decreases as the operation temperature increases; generating a second temperature code based on the second clock signal such that the second temperature code increases as the operation temperature increases; calculating a difference between the first temperature code and the second temperature code; and generating a corrected temperature code based on the difference.

BRIEF DESCRIPTION OF THE DRAWINGS

Various example embodiments will be more clearly understood from the following detailed description taken in conjunction with the accompanying drawings, in which:

FIG. 2 is a flowchart illustrating a method of measuring temperature according to some embodiments;

FIG. 5 is a circuit diagram illustrating an example an oscillation circuit included in a digital temperature sensor according to some embodiments;

FIG. 11 is a timing diagram illustrating operations of the oscillation circuit and the conversion circuit of FIG. 9, according to some embodiments;

FIGS. 21 and 22 are circuit diagrams illustrating examples of a current generation circuit included in a digital temperature sensor according to some embodiments;

DETAILED DESCRIPTION

Figure 1:
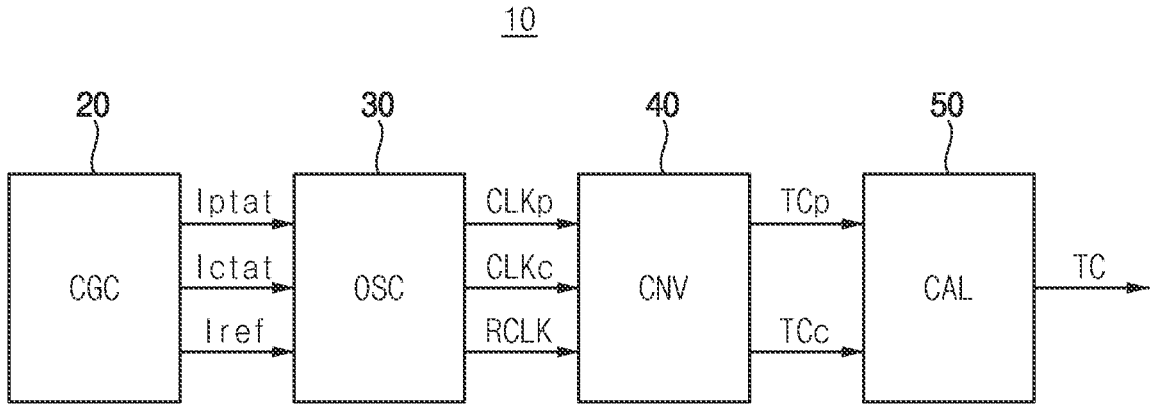
FIG. 1 is a block diagram illustrating a digital temperature sensor according to some embodiments.

Various example embodiments will be described more fully hereinafter with reference to the accompanying drawings, in which some example embodiments are shown. In the drawings, like numerals refer to like elements throughout. The repeated descriptions may be omitted. As used in this specification, the terms "first" and "second" are used merely to distinguish one component or signal from another without limiting the components or signals, and are not intended to indicate importance or order.

A semiconductor device may include a digital temperature sensor (DTS) providing temperature information in order to optimize performance according to a temperature change. In this case, the semiconductor device may perform temperature compensation for an internal operation based on the temperature measured by the digital temperature sensor. However, when the temperature measurement accuracy of the digital temperature sensor is low, performance may be significantly degraded depending on the temperature sensitivity of the semiconductor device.

Some embodiments may provide a digital temperature sensor and a method of measuring temperature, capable of providing exact operation temperature information.

The digital temperature sensor and the method of measuring temperature according to some embodiments may provide exact operation temperature information and enhance performance of the semiconductor device including the digital temperature sensor, by compensating for the nonlinear error based on a difference between a first temperature code of PTAT characteristics and a second temperature code of CTAT characteristics to generate the corrected temperature code.

FIG. 1 is a block diagram illustrating a digital temperature sensor according to some embodiments, and FIG. 2 is a flowchart illustrating a method of measuring temperature according to some embodiments.

Referring to FIG. 1, a digital temperature sensor 10 may include a current generation circuit CGC 20, an oscillation circuit OSC 30, a conversion circuit CNV 40 and a calculation circuit CAL 50.

Referring to FIGS. 1 and 2, the current generation circuit 20 may generate a proportional to absolute temperature (PTAT) current Iptat that is proportional to an operation temperature (S100) and generate a complementary to absolute temperature (CTAT) current Ictat that is inversely proportional to the operation temperature (S200).

In some example embodiments, the current generation circuit 20 may be implemented with a bandgap reference circuit configured to generate, in addition to the PTAT current Iptat and the CTAT current Ictat, a reference current Iref that is fixed regardless of the operation temperature. Example embodiments of the current generation circuit 20 will be described below with reference to FIGS. 21 and 22.

The oscillation circuit 30 may generate a first clock signal CLKp having a first cyclic period based on the PTAT current Iptat such that the first cyclic period may be inversely proportional to the PTAT current Iptat (S300). In addition, the oscillation circuit 30 may generate a second clock signal CLKc having a second cyclic period based on the CTAT current Ictat such that the second cyclic period may be inversely proportional to the CTAT current Ictat (S400). In some example embodiments, as will be described below with reference to FIGS. 9 through 15, the oscillation circuit 30 may include at least one current-controlled oscillator configured to generate the first clock signal CLKp and the second clock signal CLKc based on the PTAT current Iptat and the CTAT current Ictat. Example embodiments of the current-controlled oscillator will be described below with reference to FIGS. 3 through 6.

In some example embodiments, the oscillation circuit 30 may further generate, in addition to the first clock signal CLKp and the second clock signal CLKc, a reference clock signal RCLK having a reference cyclic period that is fixed regardless of the operation temperature based on the reference current Iref. FIG. 1 illustrates the oscillation circuit 30 generates the reference clock signal RCLK using the reference current Iref generated by the current generation circuit 20, but example embodiments are not limited thereto. According to some example embodiments, the reference clock signal RCLK may be provided to the digital temperature sensor 10 from an external component or circuit external to the digital temperature sensor 10. For example, the reference clock signal RCLK may be provided by generating an oscillation signal having a fixed cyclic period regardless of the operation temperature using a crystal oscillator and dividing the frequency of the oscillation signal.

The conversion circuit 40 may generate a first temperature code TCp based on the first clock signal CLKp such that the first temperature code TCP may decrease as the operation temperature increases (S500). In addition, the conversion circuit 40 may generate a second temperature code TCc based on the second clock signal CLKc such that the second temperature code TCc may increase as the operation temperature increases (S600). In some example embodiments, as will be described below with reference to FIGS. 9 through 15, the conversion circuit 40 may include at least one time-to-digital converter configured to convert time information to a digital value. The time-to-digital converter may receive the reference clock signal RCLK having a fixed cyclic period regardless of the operation temperature, and generate the first temperature code TCp and the second temperature code TCc using the reference clock signal RCLK. The time-to-digital converter may receive the reference clock signal RCLK having the reference cyclic period that is fixed regardless of the operation temperature, generate the first temperature code TCp by counting clocks (e.g., toggling, edge or transition) of the reference clock signal RCLK during a first counting time interval that is proportional to the first cyclic period of the first clock signal CLKp, and generate the second temperature code TCc by counting clocks of the reference clock signal RCLK during a second counting time interval that is proportional to the second cyclic period of the second clock signal CLKc.

The calculation circuit 50 may generate a corrected temperature code TC by calculating a difference between the first temperature code TCp and the second temperature code TCc (S700). In other words, in some example embodiments, the calculation circuit 50 may calculate the difference between the first temperature code TCp and the second temperature code TCc and generate the corrected temperature code TC based on the difference. In some example embodiments, as will be described below with reference to FIG. 7, the calculation circuit 50 may generate the corrected temperature code TC by subtracting the second temperature code TCc from the first temperature code TCp such that the corrected temperature code TC may decrease as the operation temperature decreases. In such example embodiments, the calculation circuit 50 may be implemented with an arithmetic logic unit (ALU) configured to perform subtraction.

As such, the digital temperature sensor 10 and the method of measuring temperature according to example embodiments may provide exact operation temperature information and enhance performance of the semiconductor device including the digital temperature sensor 10, by compensating for a nonlinear error based on the difference between the first temperature code TCp of PTAT characteristics and the second temperature code TCc of CTAT characteristics to generate the corrected temperature code TC.

Figure 3:
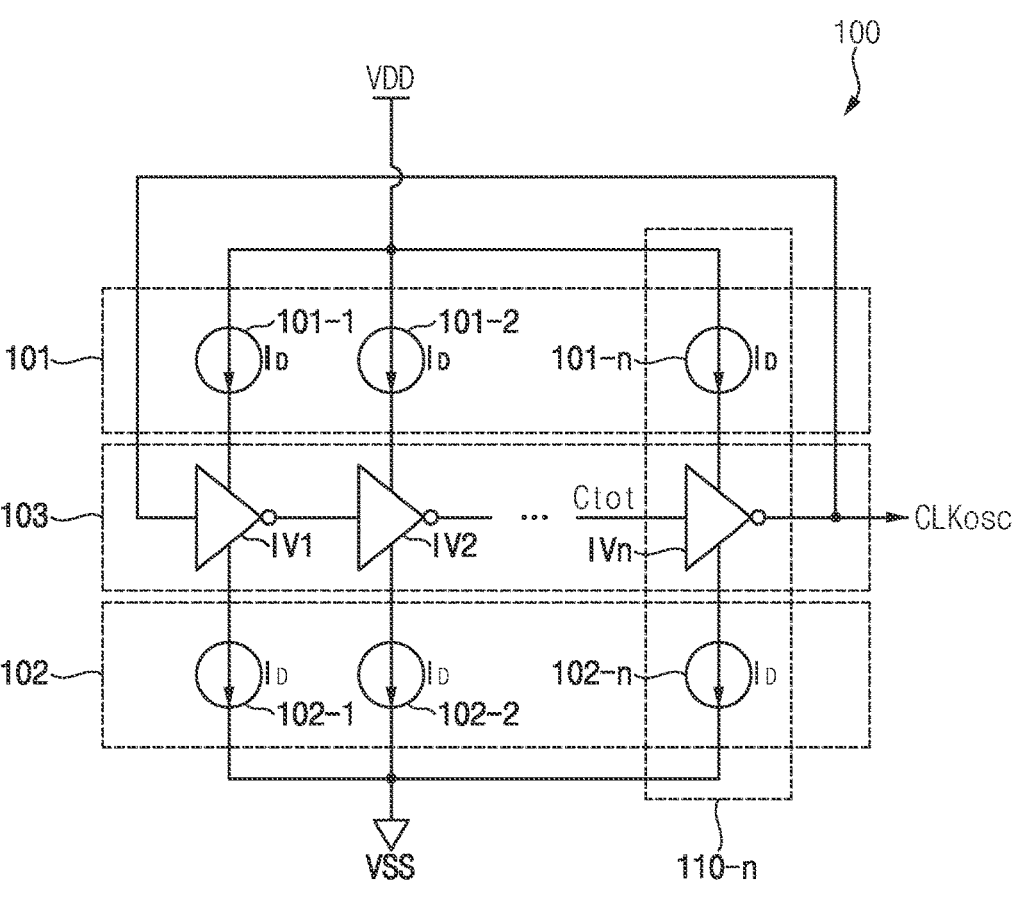
FIG. 3 is a schematic circuit diagram illustrating an example of an oscillation circuit included in a digital temperature sensor according to some embodiments.

FIG. 3 is a schematic circuit diagram illustrating an example of an oscillation circuit included in a digital temperature sensor according to some example embodiments.

Referring to FIG. 3, an oscillation circuit 100 may generate an oscillation signal CLKosc having a frequency fosc or a cyclic period Tosc using a first operation voltage VDD, a second operation voltage VSS and an operation current $I_D$.

As illustrated in FIG. 3, the oscillation circuit 100 may be implemented as a ring oscillator that uses the first operation voltage VDD, the second operation voltage VSS, and an operation current $I_D$, but example embodiments are not limited thereto. The ring oscillator, i.e., the oscillation circuit 100, may include an inverter chain 103 in which a plurality of (or an odd number of) inverters IV (IV1 through IVn) (where "n" is an odd number) are connected in a ring shape. The oscillation circuit 100 may include one or more current sources 101 (101-1 through 101-n) and 102 (102-1 through 102-n) to provide the operation current $I_D$ to the inverters IV (IV1 through IVn).

Each of the first current sources 101 (101-1 through 101-n) is connected between the first operation voltage VDD and a corresponding one of the inverters IV (IV1 through IVn). Each of the second current sources 102 (102-1 through 102-n) is connected between a corresponding one of the inverters IV (IV1 through IVn) and the second operation voltage VSS. The first current sources 101 (101-1 through 101-n) and the second current sources 102 (102-1 through 102-n) are controlled by a bias circuit. In some example embodiments, a ground voltage may be usable as the second operation voltage VSS.

Figure 4:
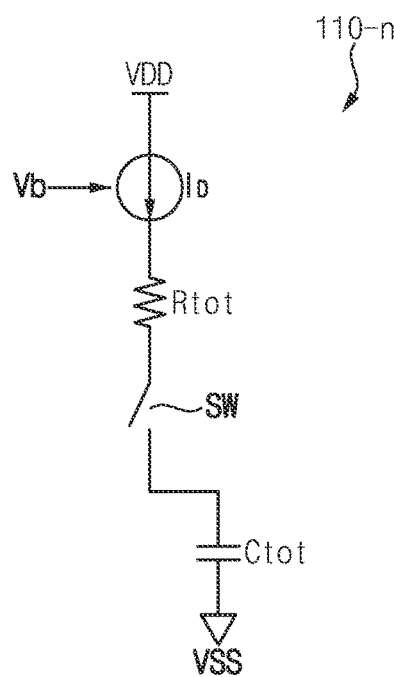
FIG. 4 is an equivalent circuit diagram of a unit circuit included in the oscillation circuit of FIG. 3, according to some embodiments.

FIG. 4 is an equivalent circuit diagram of a unit circuit included in the oscillation circuit of FIG. 3, according to some embodiments.

Referring to FIG. 4, a unit circuit 110-n may be represented as an equivalent circuit including a single current source providing the operation current $I_D$, a resistor Rtot, a capacitor Ctot, and a switch SW. Accordingly, a frequency fosc of the oscillation signal CLKosc output from the oscillation circuit 100 (hereinafter, referred to as an oscillation frequency fosc) may be defined as Expression 1.

$$1/Tosc = fosc = ID/(n \cdot Ctot \cdot VDD) \qquad \text{Expression 1}$$

As shown in Expression 1, the oscillation frequency fosc is inversely proportional to the first operation voltage VDD and is proportional to the operation current $I_D$. In other words, the cyclic period Tosc of the oscillation signal CLKosc is proportional to the first operation voltage VDD and is inversely proportional to the operation current $I_D$. The operation current ID is proportional to a bias voltage Vb, and bias voltage Vb is inversely proportional to an input current Iosc of a current-controlled oscillator 60 as will be described below with reference to FIG. 5. As a result, the cyclic period Tosc of the oscillation signal CLKosc may be inversely proportional to the input current Iosc as Expression 2.

$$Tosc = \beta/Iosc \qquad \text{Expression 2}$$

In Expression 2, Tosc indicates the cyclic period of the oscillation signal CLKosc, Iosc indicates the input current of the current-controlled oscillator and indicates a constant value that $\beta$ is determined depending on characteristics of the current-controlled oscillator.

FIG. 5 is a circuit diagram illustrating an example of an oscillation circuit included in a digital temperature sensor according to some example embodiments. FIG. 5 illustrates an example of a current-controlled oscillator 60.

Referring to FIG. 5, the current-controlled oscillator 60 includes an oscillation circuit 100 and a bias circuit 200. The oscillation circuit 100 illustrated in FIG. 5 may have the same structure as the oscillation circuit 100 illustrated in FIG. 3 or, in some example embodiments, may further include a capacitor connected between the first operation voltage VDD and the ground voltage. The oscillation circuit 100 illustrated in FIG. 5 is connected to the first operation voltage VDD and the ground voltage.

The bias circuit 200 is a circuit for mirroring the input current Iosc to the operation current $I_D$. The bias circuit 200 may include a first transistor M1, a second transistor M2, and a third transistor M3. In some example embodiments, the first and second transistors M1 and M2 may be NMOS transistors, and the third transistor M3 may be a PMOS transistor. The gate and drain of the first transistor M1 are commonly connected to the first node N1, and the source is connected to the ground voltage. The gate of the second transistor M2 is connected to the first node N1, the drain is connected to the second node N2, and the source is connected to the ground voltage. The gate and drain of the third transistor M3 are commonly connected to the second node N2, and the source is connected to the first operation voltage VDD. The bias voltage of the first node N1 controls the second current sources 102-1 to 102-*n*, and the bias voltage of the second node N2 controls the first current sources 101-1 to 101-*n*. to control The bias circuit 200 controls the operation current $I_D$ of the oscillation circuit 100. The bias circuit 200 may mirror the input current Iosc, which changes as the temperature rises, to the operation current $I_D$. The input current Iosc may correspond to the aforementioned PTAT current Iptat, the CTAT current Ictat, or the reference current Iref, and the oscillation signal CLKosc according to the input current Iosc may correspond to the aforementioned first clock signal CLKp, the second clock signal CLKc, or the reference clock signal RCLK depending on the input current Iosc. When the input current Iosc increases and the input current Iosc is mirrored and used as the operation current ID of the oscil-lation unit 100, the output frequency fosc of the oscillation unit 100 according to the increase of the input current Iosc also increases. Therefore, as shown in Expression 2 above, the cycle period Tosc of the oscillation signal CLKosc generated by the current-controlled oscillator 60 is inversely proportional to the input current Iosc of the current con-trolled oscillator 60.

Figure 6:
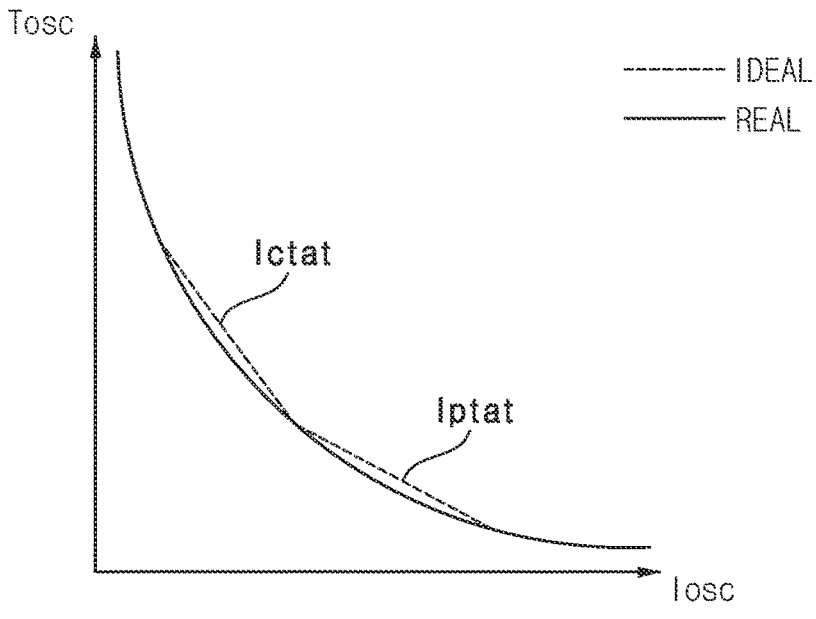
FIG. 6 is a diagram illustrating operation characteristics of the oscillation circuit of FIG. 5, according to some embodiments.

FIG. 6 is a diagram illustrating operation characteristics of the oscillation circuit of FIG. 5.

FIG. 6 shows an inversely proportional relationship between the cyclic period Tosc of the oscillation signal CLKosc in Expression 2 and the input current Iosc of the current-controlled oscillator 60, according to some embodi-ments. In FIG. 6, a solid line represents a real relationship and a dotted line represents an ideal relationship.

In the ideal case, the cyclic period Tosc of the oscillation signal CLKosc changes linearly according to the PTAT current Iptat and the CTAT current Ictat sensed at the operation temperature. However, as shown in FIG. 6, the real cycle period Tosc of the oscillation signal CLKosc is always smaller than an ideal value that changes linearly. As such, since the PTAT current Iptat and the CTAT current Ictat have the same error direction smaller than the ideal value, the difference between the first temperature code TCp and the second temperature code TCc may be provided as the final corrected temperature code (TC) as will be described below with reference to FIGS. 7 and 9. The nonlinear error of the first temperature code (TCp) and the nonlinear error of the second temperature code (TCc) may be cancelled; thereby reducing the nonlinear error of the corrected tem-perature code (TC) may be reduced.

Figure 7:
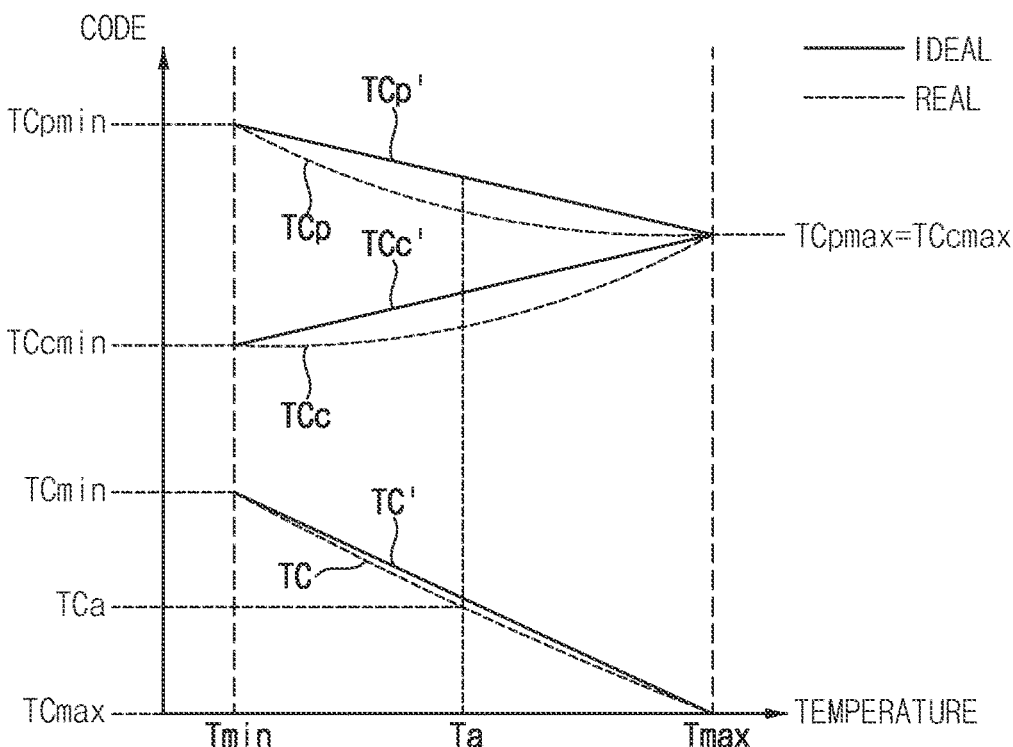
FIGS. 7 and 8 are diagrams illustrating operation characteristics of a digital temperature sensor according to some embodiments.
Figure 8:
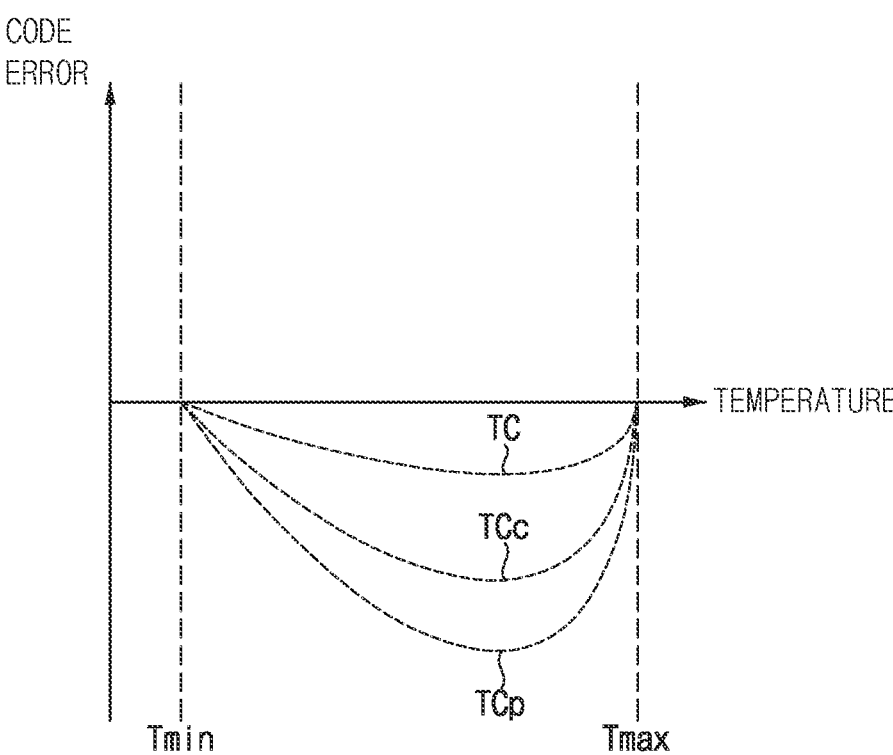

FIGS. 7 and 8 are diagrams illustrating operation char-acteristics of a digital temperature sensor according to some example embodiments.

FIG. 7 illustrates an example change of a code according to an operation temperature and FIG. 8 illustrates a code error, that is, a nonlinear error corresponding to the case of FIG. 7, according to some embodiments. In FIGS. 7 and 8, a solid line represents a real relationship and a dotted line represents an ideal relationship. TCp' represents an ideal first temperature code and TCp represents an actual (real) first temperature code. TCc' represents an ideal second tempera-ture code and TCc represents an actual second temperature code. TC' represents the ideal compensated temperature code and TC represents the actual compensated temperature code.

For example, a digital temperature sensor may be imple-mented to measure an operation temperature Ta between a minimum temperature Tmin and a maximum temperature Tmax. In this case, the first temperature code TCpmin and the second temperature code TCcmin at the minimum tem-perature Tmin and the first temperature code TCpmax and the second temperature code TCcmax at the maximum temperature Tmax may be measured and stored. The opera-tion temperature Ta may be derived by considering a linear relationship from the measured compensation temperature code TCa using these stored values. FIG. 7 shows an example in which the first temperature code TCpmax and the second temperature code TCcmax at the maximum tempera-ture Tmax are set to the same value, but example embodi-ments are not limited thereto. According to example embodiments, the first temperature code TCpmax and the second temperature code TCcmax at the maximum tempera-ture Tmax may be different from each other.

In an example embodiment, the calculation circuit 50 in FIG. 1 subtracts the actual second temperature code TCc from the actual first temperature code TCp as shown in Expression 3 to generate the corrected temperature code TC that decreases as the operation temperature decreases.

$$TC=TCp-TCc \hspace{3cm} \text{Expression 3}$$

In this case, as shown in FIG. 8, the nonlinear error of the first temperature code TCp and the nonlinear error of the second temperature code TCc may be canceled or offset such that the corrected temperature code TC has a reduced nonlinear error. In other words, the nonlinear error of the corrected temperature code TC may be smaller than the nonlinear error of the first temperature code TCp, and the nonlinear error of the corrected temperature code TC may be smaller than the nonlinear error of the second temperature code TCc.

As such, the digital temperature sensor and the method of measuring temperature according to example embodiments may provide exact operation temperature information and enhance performance of the semiconductor device including the digital temperature sensor, by compensating for the nonlinear error based on the difference between the first temperature code TCp of PTAT characteristics and the second temperature code TCc of CTAT characteristics to generate the corrected temperature code.

Figure 9:
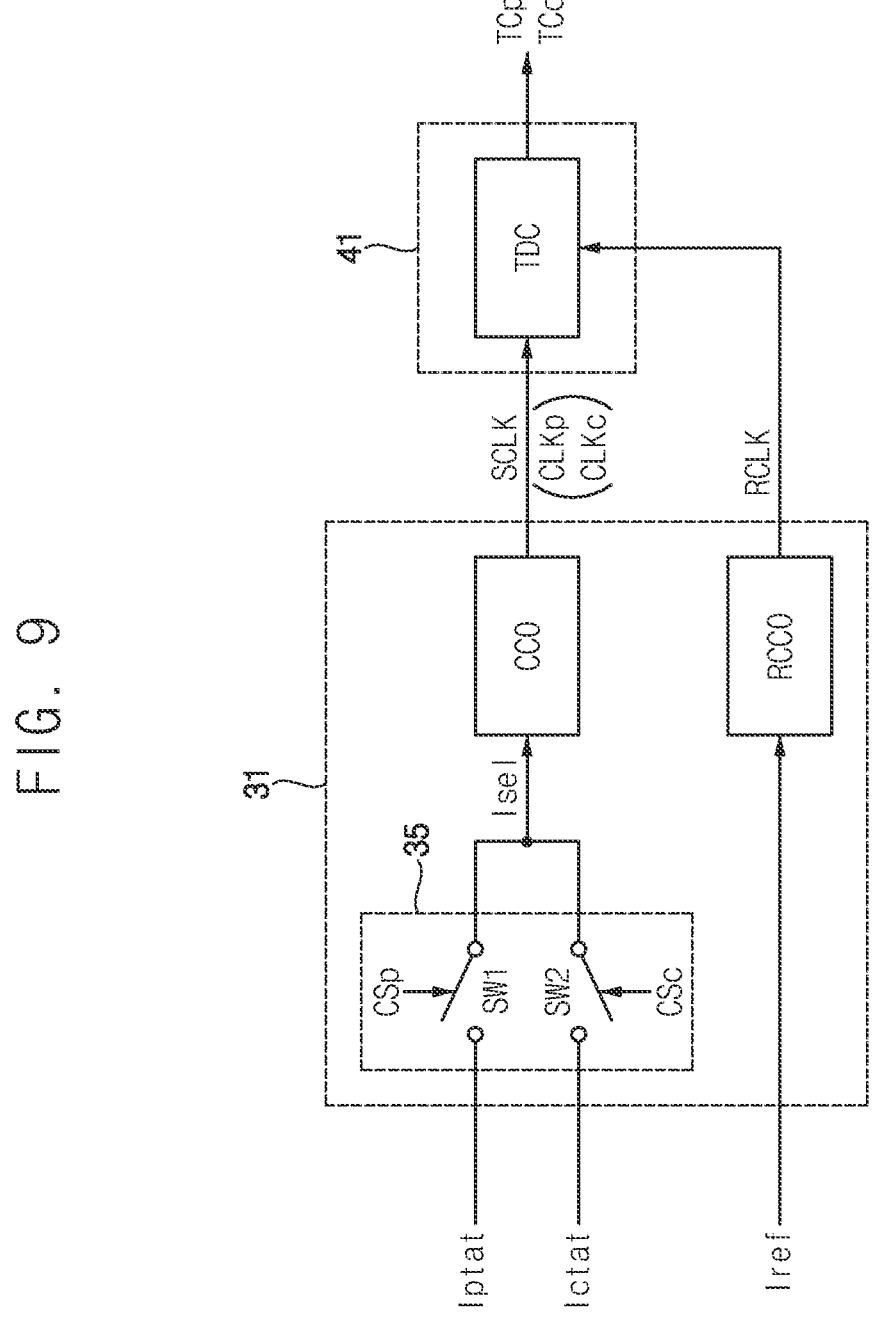
FIG. 9 is a diagram illustrating an example an oscillation circuit and a conversion circuit included in a digital temperature sensor according to some embodiments.
Figure 10:
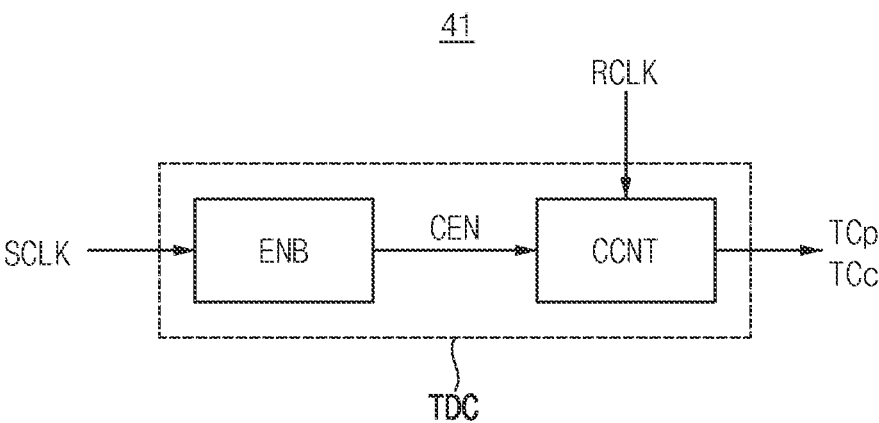
FIG. 10 is a diagram illustrating an example of a common time-to-digital converter included in the conversion circuit of FIG. 9, according to some embodiments.

FIG. 9 is a diagram illustrating an example of an oscil-lation circuit and a conversion circuit included in a digital temperature sensor according to some example embodi-ments, and FIG. 10 is a diagram illustrating an example of a common time-to-digital converter included in the conver-sion circuit of FIG. 9, according to some example embodi-ments.

Referring to FIG. 9, an oscillation circuit 31 may include a current selection circuit 35 and a common current con-trolled oscillator CCO. The current selection circuit 35 may include a first switch SW1 and a second switch SW2. According to example embodiments, the oscillation circuit 31 may further include a reference current controlled oscil-lator RCCO. Example embodiments of the common current controlled oscillator CCO and the reference current con-trolled oscillator RCCO are as described above with refer-ence to FIG. 5.

The conversion circuit 41 may include one common time-to-digital converter TDC. As illustrated in FIG. 10, the common time-to-digital converter TDC 41 may include an enable circuit ENB and a clock counter CCNT.

The operation of the oscillation circuit 31 and the con-version circuit 41 of FIGS. 9 and 10 will be described below with reference to FIG. 11.

FIG. 11 is a timing diagram illustrating operations of the oscillation circuit and the conversion circuit of FIG. 9, according to some example embodiments.

Referring to FIGS. 9, 10 and 11, the current selection circuit 31 may receive the PTAT current Iptat and the CTAT current Ictat. The current selection circuit 31 may generate a selection current Isel that includes the PTAT current Iptat during a first sensing period PSEN and includes the CTAT current Ictat during a second sensing period CSEN.

The first switch SW1 may provide the PTAT current Iptat as the selection current Isel to the common current-controlled oscillator CCO during the first sensing period PSEN corresponding to time interval T1~T3 in response to a first switch control signal CSp that is activated within the first sensing period PSEN. The second switch SW2 may provide the CTAT current Ictat as the selection current Isel to the common current-controlled oscillator CCO during the second sensing period CSEN corresponding to time interval T4~T6 in response to a second switch control signal CSc that is activated within the second sensing period CSEN. The first switch control signal CSp and the second switch control signal CSc may be provided from a control logic included in the digital temperature sensor or a semiconductor device including the digital temperature sensor.

The common current-controlled oscillator CCO may generate a selection clock signal SCLK based on the selection current Isel such that the selection clock signal SCLK may include the first clock signal CLKp during the first sensing period PSEN and include the second clock signal CLKc during the second sensing period CSEN.

The reference current-controlled oscillator RCCO may generate the reference clock signal RCLK having the reference cyclic period that is fixed regardless of the operation temperature, based on the reference current Iref that is fixed regardless of the operation temperature.

The enable circuit ENB in the common time-to-digital converter TDC may generate a counting enable signal CEN by counting clocks of the selection clock signal SCLK by a reference number during the first sensing period PSEN and by counting clocks of the selection clock signal by the reference number during the second sensing period CSEN. In other words, the enable circuit ENB may count a reference number of clocks of the selection clock signal SCLK during the first sensing period PSEN to generate a counting enable signal CEN according to the counted number of clocks in the first sensing period PSEN, and may count the reference number of clocks of the selection clock signal during the second sensing period CSEN to generate a counting enable signal CEN according to the counted number of blocks in the second sensing period CSEN. For example, assuming the reference number is 8 clocks, the enable circuit ENB may count 8 clocks of the selection clock signal SCLK during the first sensing period PSEN to generate a counting enable signal CEN that is high for the 8 clocks. Accordingly, an activation time interval of the counting enable signal CEN during the first sensing period PSEN may correspond to a first counting time interval tCN1 that is proportional to the first cyclic period of the first clock signal CLKp and an activation time interval of the counting enable signal CEN during the second sensing period CSEN may correspond to a second counting time interval tCN2 that is proportional to the second cyclic period of the second clock signal CLKc. By counting clocks by the predetermined reference number, the first counting time interval tCN1 corresponding to time interval T1~T2 may be proportional to the first cycle period of the first clock signal CLKp, and the second counting time interval tCN2 corresponding to time interval T4~T5 may be proportional to the second cycle period of the second clock signal CLKc. Meanwhile, states of the oscillation circuit 31 and the conversion circuit 41 may be initialized in a reset period RST corresponding to the time interval T3~T4.

The clock counter CCNT in the common time-to-digital converter TDC may receive the reference clock signal RCLK having the reference cyclic period that is fixed regardless of the operation temperature. The clock counter CCNT may generate the first temperature code TCp by counting clocks of the reference clock signal RCLK during the first counting time interval tCN1 based on the counting enable signal CEN, and generate the second temperature code TCc by counting clocks of the reference clock signal RCLK during the second counting time interval tCN2 based on the counting enable signal CEN.

As described with reference to FIGS. 9, 10 and 11, the common current-controlled oscillator CCO may sequentially generate the first clock signal CLKp and the second clock signal CLKc respectively based on the PTAT current Iptat and the CTAT current Ictat. The common time-to-digital converter TDC may sequentially generate the first temperature code TCp and the second temperature code TCc respectively based on the first clock signal CLKp and the second clock signal CLKc. As such, the digital temperature sensor according to example embodiments may sequentially generate the first temperature code TCp and the second temperature code TCc in a time-multiplexing scheme using one common current controlled oscillator CCO and one common time-to-digital converter TDC.

Figure 12:
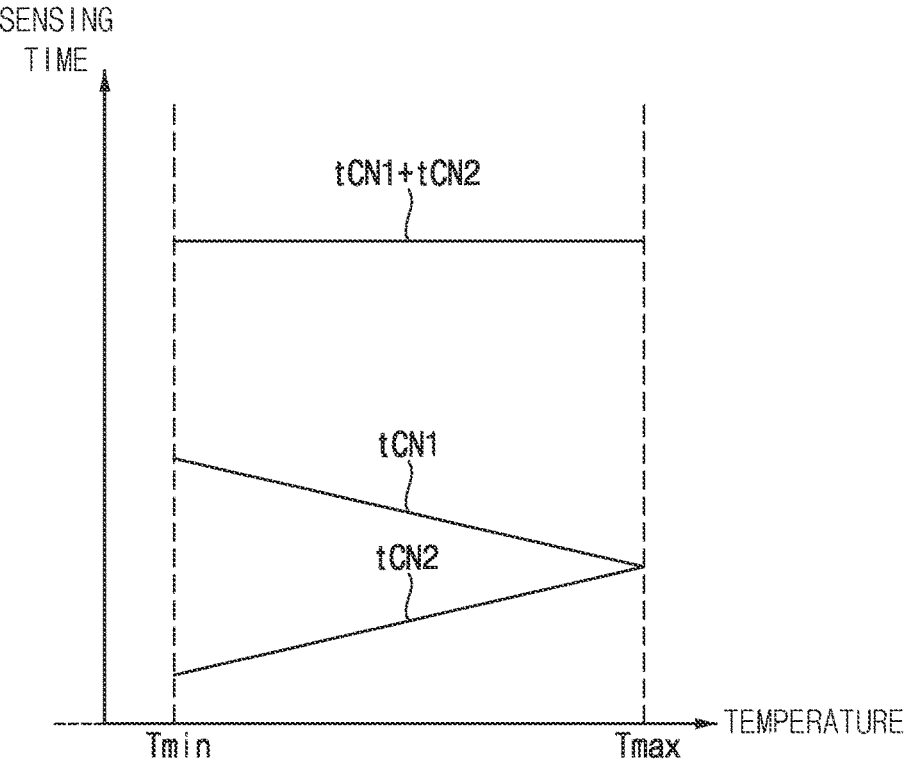
FIG. 12 is a diagram illustrating a sensing time of a digital temperature sensor according to some embodiments.

FIG. 12 is a diagram illustrating a sensing time of a digital temperature sensor according to some example embodiments.

Referring to FIGS. 9 through 12, the first counting time interval tCN1 may decrease as the operation temperature increases, and the second counting time interval tCN2 may increase as the operation temperature increases. As a result, the sum (tCN1+tCN2) of the first counting time interval tCN1 and the second counting time interval tCN2 corresponding to the entire sensing time may be maintained constant.

Meanwhile, referring to FIG. 7 again, in order to express the operation temperature between the minimum temperature Tmin and the maximum temperature Tmax, the first temperature code TCp varies in the range between TCpmin and TCpmax, and the second temperature code TCc varies in the range between TCcmin and TCcmax. On the other hand, to express the operation temperature between the minimum temperature Tmin and maximum temperature Tmax, the correction temperature code TC varies in the range between TCmin and TCmax. In other words, when expressing the same temperature range, the range of the correction temperature code TC is wider than the respective ranges of the first temperature code TCp and the second temperature code TCc. As such, operation temperature information having improved resolution may be provided through the correction temperature code TC corresponding to the difference between the first temperature code TCp and the second temperature code TCc.

Figure 13:
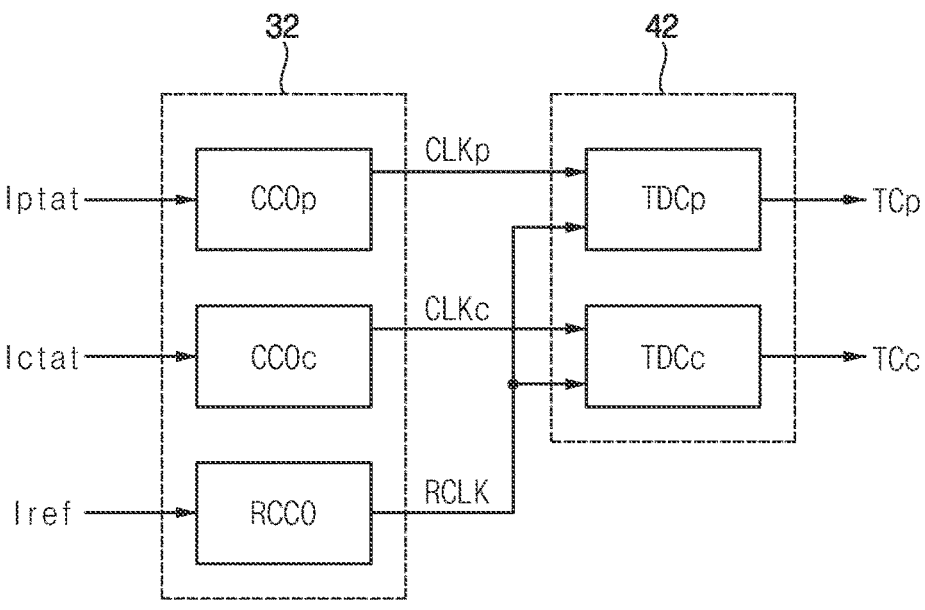
FIG. 13 a diagram illustrating an example an oscillation circuit and a conversion circuit included in a digital temperature sensor according to some embodiments.
Figure 14:
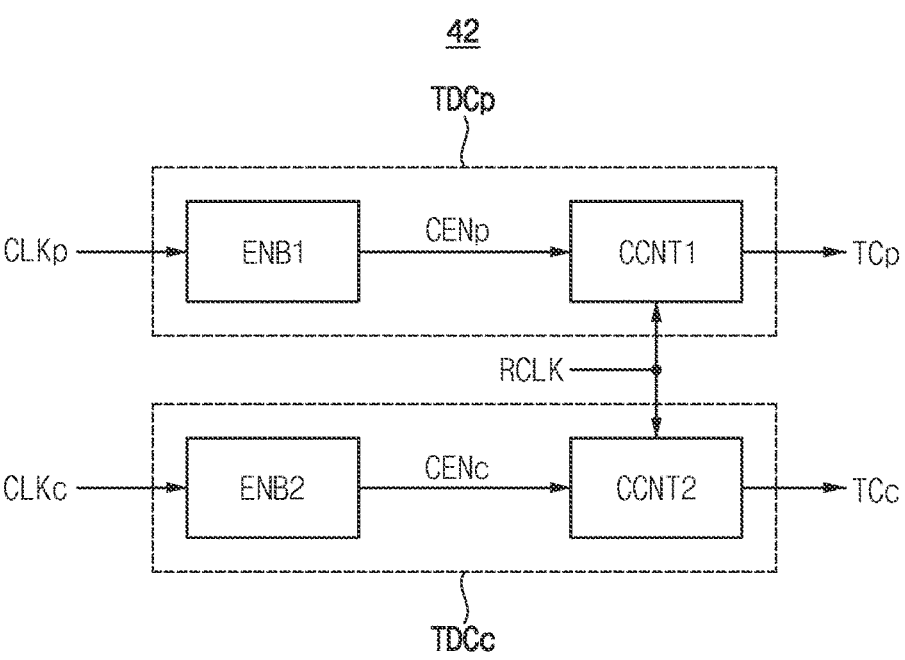
FIG. 14 is a diagram illustrating an example of a common time-to-digital converter included in the conversion circuit of FIG. 13, according to some embodiments.

FIG. 13 a diagram illustrating an example of an oscillation circuit and a conversion circuit included in a digital temperature sensor according to some example embodiments, and FIG. 14 is a diagram illustrating an example of a common time-to-digital converter included in the conversion circuit of FIG. 13, according to some example embodiments.

Referring to FIG. 13, an oscillation circuit 32 may include a first current-controlled oscillator CCOp and a second current-controlled oscillator CCOc. In some example embodiments, the oscillation circuit 32 may further include a reference current-controlled oscillator RCCO. Example embodiments of the first current controlled oscillator CCOp, the second current-controlled oscillator CCOc and the reference current controlled oscillator RCCO are as described above with reference to FIG. 5.

The conversion circuit 42 may include a first time-to-digital converter TDCp and a second time-to-digital converter TDCc. As illustrated in FIG. 14, the first time-to-digital converter TDCp may include a first enable circuit ENB1 and a first clock counter CCNT1, and the second time-to-digital converter TDCc may include a second enable circuit ENB2 and a second clock counter CCNT2.

The operation of the oscillation circuit 32 and the conversion circuit 42 of FIGS. 13 and 14 will be described below with reference to FIG. 15.

Figure 15:
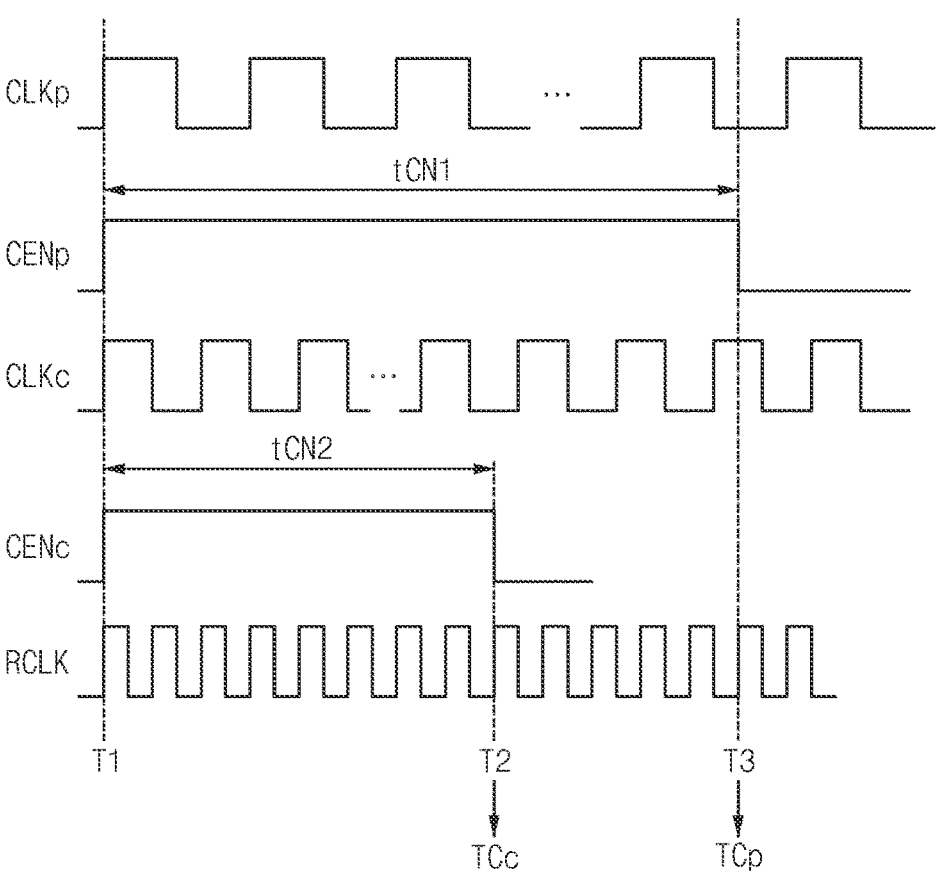
FIG. 15 is a timing diagram illustrating operations of the oscillation circuit and the conversion circuit of FIG. 13, according to some embodiments.

FIG. 15 is a timing diagram illustrating operations of the oscillation circuit and the conversion circuit of FIG. 13, according to some example embodiments.

Referring to FIGS. 13, 14 and 15, the first current-controlled oscillator CCOp may generate the first clock signal CLKp based on the PTAT current Iptat, and the second current-controlled oscillator CCOc may generate the second clock signal CLKc based on the CTAT current Ictat.

The reference current-controlled oscillator RCCO may generate the reference clock signal RCLK having the reference cyclic period that is fixed regardless of the operation temperature, based on the reference current Iref that is fixed regardless of the operation temperature.

The first enable circuit ENB1 in the first time-to-digital converter TDCp may generate a first counting enable signal CENp by counting clocks of the first clock signal CLKp by a reference number such that an activation time interval of the first counting enable signal CENp may correspond to a first counting time interval tCN1 that is proportional to the first cyclic period of the first clock signal CLKp. The second enable circuit ENB2 in the second time-to-digital converter TDCc may generate a second counting enable signal CENc by counting clocks of the second clock signal CLKc by the reference number such that an activation time interval of the second counting enable signal CENc may correspond to a second counting time interval tCN2 that is proportional to the second cyclic period of the second clock signal CLKc. The reference number may be predetermined. By counting clocks by the reference number, the first counting time interval tCN1 corresponding to time interval T1~T3 may be proportional to the first cycle period of the first clock signal CLKp, and the second counting time interval tCN2 corresponding to time interval T1~T2 may be proportional to the second cycle period of the second clock signal CLKc.

The first clock counter CCNT1 in the first time-to-digital converter TDCp may receive the reference clock signal RCLK having the reference cyclic period that is fixed regardless of the operation temperature, and generate the first temperature code TCp by counting clocks of the reference clock signal RCLK during the first counting time interval tCN1 based on the first counting enable signal CENp. The second clock counter CCNT2 in the second time-to-digital converter TDCc may receive the reference clock signal RCLK, and generate the second temperature code TCc by counting clocks of the reference clock signal RCLK during the second counting time interval tCN2 based on the second counting enable signal CENc.

As described with reference to FIGS. 13, 14 and 15, the first current-controlled oscillator CCOp and the second current-controlled oscillator CCOc may independently generate the first clock signal CLKp and the second clock signal CLKc respectively based on the PTAT current Iptat and the CTAT current Ictat. The first time-to-digital converter TDCp and the second time-to-digital converter TDCc may independently generate the first temperature code TCp and the second temperature code TCc respectively based on the first clock signal CLKp and the second clock signal CLKc. As such, the digital temperature sensor according to example embodiments may generate the first temperature code TCp and the second temperature code TCc in parallel using the two current controlled oscillators CCOp and CCOc and the two time-to-digital converters TDCp and TDCc.

Hereinafter, example embodiments of the clock counters CCNT, CCNT1 and CCNT2 of FIGS. 10 and 14 will be described with reference to FIGS. 16 through 20, according to some example embodiments.

Figure 16:
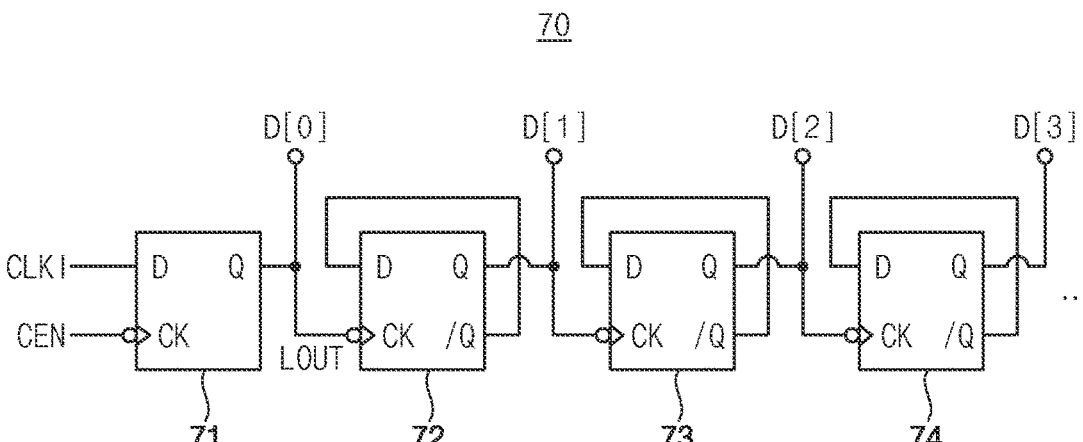
FIG. 16 is a diagram illustrating an example of a clock counter included in a conversion circuit of a digital temperature sensor according to some embodiments.
Figure 17:
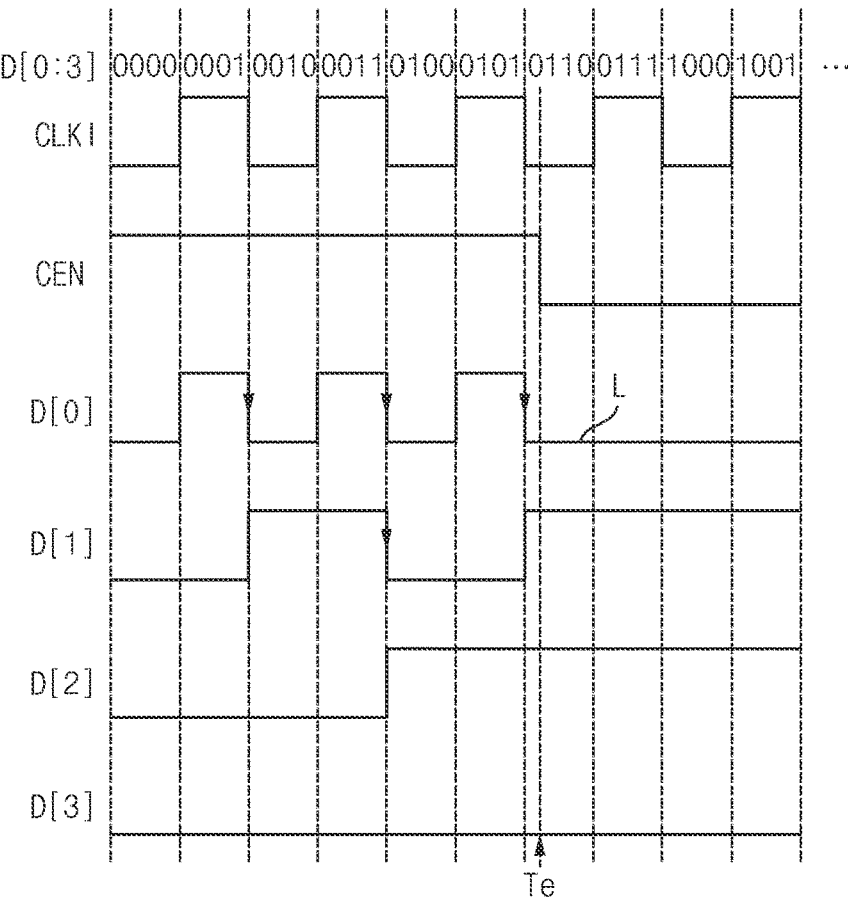
FIG. 17 is a timing diagram illustrating operations of the clock counter of FIG. 16, according to some embodiments.

FIG. 16 is a diagram illustrating an example of a clock counter included in a conversion circuit of a digital temperature sensor according to some example embodiments, and FIG. 17 is a timing diagram illustrating operations of the clock counter of FIG. 16, according to some example embodiments.

Referring to FIG. 16, a clock counter 70 may include a first counting unit 71, a second counting unit 72, a third counting unit 73 and a fourth counting unit 74. In some example embodiments, the first to fourth counting units 71~74 may be latches, respectively. In some example embodiments, the first to fourth counting units 71~74 may be D flip-flops, respectively. The first through fourth counting units 71~74 may generate first through fourth bit signals D[0], D[1], D[2] and D[3] of a temperature code D[0:3], respectively. The first counting unit 71 may correspond to a buffer unit, and the second through fourth counting units 72, 73 and 74 may correspond to a ripple counter.

Referring to FIGS. 16 and 17, the first counting unit 71 corresponding to the buffer unit generates the first bit signal D[0] by latching the input clock signal CLKI at a termination time point Te of a counting operation. The second, third and fourth counting units 72, 73 and 74 corresponding to the ripple counter generates, in response to a latch output signal LOUT corresponding to the first bit signal D[0], the upper bit signals, that is, the second bit signal D[1], the third bit signal D[2] and the fourth bit signal D[3] that are sequentially toggling. The latch output signal LOUT may be the first bit signal D[0] or an inversion signal /D[0] of the first bit signal D[0] according to the configuration of the clock counter 70.

In an example embodiment, the first counting unit 71 may latch the input clock signal CLKI in response to the counting enable signal CEN indicating the termination time point Te of the counting operation to generate the first bit signal D[0] having a logic level corresponding to a logic level of the input clock signal CLKI at the termination time point Te. The first bit signal D[0] toggles during the counting operation and is a latched signal of the input clock signal CLKI at the termination time point Te to provide the least significant bit of the temperature code D[0:3] corresponding to the count result.

The ripple counter 72, 73 and 74 in the clock counter 70 may include an arbitrary number of counting units depending on the bit number of the temperature code corresponding to the count result. Even though three counting units 72, 73 and 74 are illustrated in FIGS. 16 and 17 for convenience of illustration and description, the number of the counting units included in the ripple counter may be changed according to the bit number of the temperature code.

The ripple counter has a cascade configuration such that the plurality of counting units 72, 73 and 74 are sequentially coupled to perform toggling in response to an output signal of the previous counting unit. In other words, the second counting unit 72 performs toggling in response to the latch output signal LOUT from the first counting unit 71, the third counting unit 73 performs toggling in response to the output signal from the second counting unit 72, and the fourth counting unit 74 performs toggling in response to the output signal from the third counting unit 73. As a result, the upper signals, that is, the second bit signal D[1], the third bit signal D[2] and the fourth bit signal D[3] have respective cyclic periods that are sequentially doubled.

As illustrated in FIG. 17, an edge (e.g., a falling edge) of the counting enable signal CEN may indicate the termination time point Te of the counting operation, and the first counting unit 71 may buffer the input clock signal CLKI and latch the logic level of the input clock signal CLKI in response to the edge of the counting enable signal CEN to generate the first bit signal D[0]. FIG. 17 illustrates a case where the logic level of the input clock signal CLKI is logic low 'L' at the termination time point Te of the counting operation.

The first counting unit 71 may perform a function of buffer such that the first bit signal D[0] toggles with the input clock signal CLKI until the counting operation is terminated. The upper bit signals D[1], D[2] and D[3] generated by the ripple counter may toggle in response to the output signal of the previous stage, for example, the falling edge of the adjacent lower bit. That is, the second bit signal D[1] toggles in response to the falling edge of the first bit signal D[0], which is the latch output signal LOUT, and the third bit signal D[2] toggles in response to the falling edge of the second bit signal D[1], and the fourth bit signal D[3] toggles in response to the falling edge of the third bit signal D[2]. As a result, the upper bit signals D[1], D[2], and D[3] have a sequentially doubling period and represent the upper three bits of the temperature code D[0:3]. The first bit signal D[0] corresponding to the least significant bit signal of the temperature code D[0:3] is a signal provided by latching the input clock signal CLKI at the end of the counting operation as described above.

In the upper portion of FIG. 17, values of the binary code or the temperature code D[0:3] are illustrated for each end point of the counting operation over time, and the binary code (D[0:3]) increases as 0000, 0001, 0010, 0011, which indicates that the up-counting is performed.

As shown in FIG. 17, since the clock counter 70 according to some example embodiments may count twice for each cyclic period of the input clock signal CLKI, the operation speed is doubled compared to a typical ripple counter. This double speed counting may be referred to as Double Data Rate (DDR) counting, and a counter circuit performing this may be referred to as a DDR counter circuit.

Figure 18:
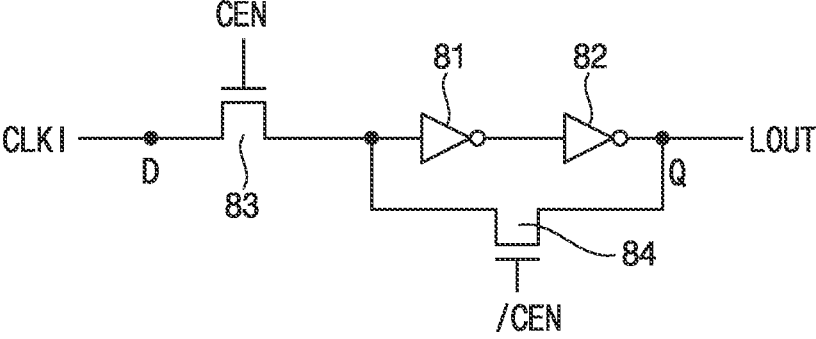
FIGS. 18, 19 and 20 are circuit diagrams illustrating examples of counting units included in the clock counter of FIG. 16, according to some embodiments.
Figure 19:
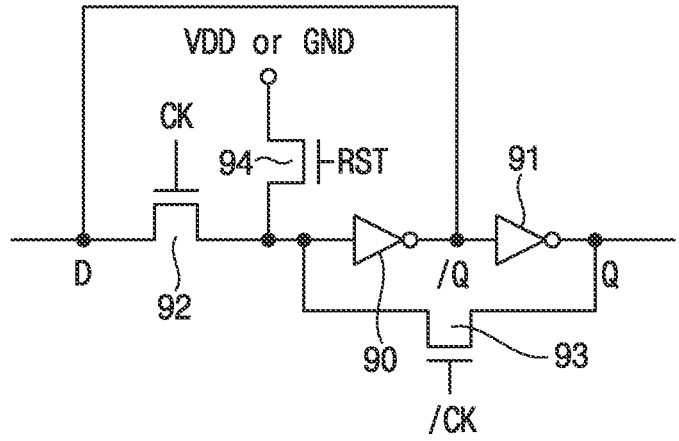
Figure 20:
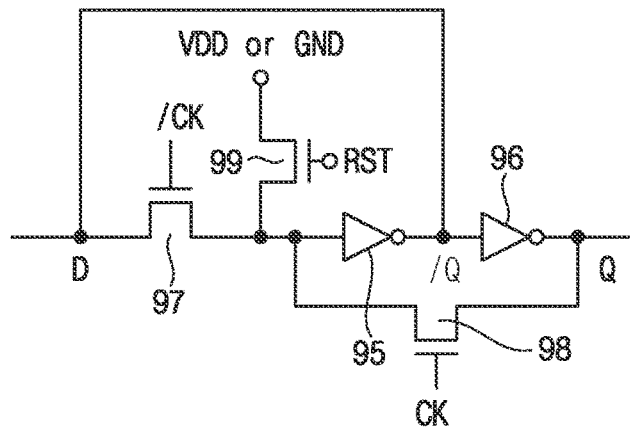

FIGS. 18, 19 and 20 are circuit diagrams illustrating examples of counting units included in the clock counter of FIG. 16, according to some embodiments.

FIG. 18 illustrates a latch included in the first counting unit 71 corresponding to a buffer unit, according to some embodiments.

Referring to FIG. 18, a latch may include a first inverter 81, a second inverter 82, a first switch 83 and a second switch 84.

The output of the first inverter 81 is coupled to the input of the second inverter 82, and the output of the second inverter 82 is coupled to the input of the first inverter 81 via the second switch 84, thereby forming a latch configuration. In the example of FIG. 18, the output of the second inverter 82 corresponds to a non-inversion output terminal Q. The first switch 83 is coupled between a data terminal D and the input of the first inverter 81. The input clock signal CLKI is applied to a data terminal D, the counting enable signal CEN indicating the termination time point is applied to the control terminal of the first switch 83, and an inverted input signal /CEN is applied to the control terminal of the second switch 84.

As illustrated in FIG. 17, an edge (e.g., a falling edge) of the counting enable signal CEN may indicate the termination time point Te. In this case, the first switch 83 is turned on and the second switch 84 is turned off until the termination time point Te, and thus the latch of FIG. 18 may perform a buffering operation. When the counting enable signal CEN transitions from logic high to logic low at the termination time point Te, the first switch 83 is turned off and the second switch 84 is turned on, thereby latching the logic level of the input clock signal CLKI at the termination time point Te. As a result, the latch output signal LOUT at the non-inversion output terminal Q toggles with the input clock signal CLKI until the termination time point Te and maintains the latched logic level after the termination time point Te.

FIGS. 19 and 20 are circuit diagrams illustrating examples of flip-flops performing a toggling operation, according to some example embodiments.

FIG. 19 illustrates an example of a positive-edge triggered flip-flop and FIG. 20 illustrates an example of a negative-edge triggered flip-flop. The non-limiting example configuration of the flip-flops in FIGS. 19 and 20 are presented for describing the toggling operation of the flip-flops, that is, the counting units 72, 73 and 74 of FIG. 16, and the configuration of the flip-flops may be variously changed.

Referring to FIG. 19, the positive-edge triggered flip-flop may include a first inverter 90, a second inverter 91, a first switch 92 and a second switch 93.

The output of the first inverter 90 is coupled to the input of the second inverter 91, and the output of the second inverter 91 is coupled to the input of the first inverter 90 via the second switch 93, thereby forming a latch configuration. In the example of FIG. 19, the output of the first inverter 90 corresponds to an inversion output terminal /Q and the output of the second inverter 91 corresponds to a non-inversion output terminal Q. The first switch 92 is coupled between a data terminal D and the input of the first inverter 90 and the control terminal CK of the first switch 92 corresponds to a clock terminal. A clock signal CLK is applied to the control terminal CK of the first switch 92 and an inversion signal /CLK of the clock signal CLK is applied to the control terminal /CK of the second switch 93.

The positive-edge triggered flip-flop of FIG. 19 may further include a reset switch 94 for initializing a state of the flip-flop. When the reset switch 94 is turned on in response to a reset signal RST, the inversion output terminal /Q and the output terminal Q may be initialized respectively to logic low or logic high depending on the reset voltage VDD or GND.

When the clock signal CLK applied to the control terminal CK is logic low, the flip-flop of FIG. 19 is in a storage state that does not change even though the logic level of the data terminal D is changed. When the clock signal CLK transitions from logic low to logic high, that is, at the rising edge of the clock signal CLK, the logic level of the data terminal D is transferred into the non-inversion output terminal Q. The flip-flop such that the logic state is determined in synchronization with the edge of the signal applied to the clock terminal CK is referred to as an edge triggered flip-flop, ant the flip-flop of FIG. 19 corresponds to a positive-edge triggered flip-flop.

The positive-edge triggered flip-flop may perform toggling when the inversion output terminal /Q is coupled to the data terminal D. When the clock signal CLK applied to the control terminal CK transitions to logic low, the second switch 93 is turned on and the data terminal D is set to logic level opposite to the non-inversion output terminal Q but the state of the flip-flop is not changed since the first switch 92 is turned off. When the clock signal CLK transitions to logic high, the first switch 92 is turned on and logic level of the inversion output terminal is applied to the input of the first inverter 90, thereby inverting the logic state of the non-inverting output terminal Q. As such, the positive-edge triggered flip-flop performs toggling by inverting the storage state from logic high to logic low or from logic low to logic high at each rising edge of the clock signal CLK applied to the control terminal CK.

Referring to FIG. 20, a negative-edge triggered flip-flop may include a first inverter 95, a second inverter 96, a first switch 97 and a second switch 98, and may further include a reset switch 99. The negative-edge triggered flip-flop has a configuration similar to the positive-edge triggered flip-flop of FIG. 19, but the inversion signal /CLK of the clock signal CLK is applied to the control gate /CK of the first switch 97 and the clock signal CLK is applied to the control gate CK of the second switch 98. That is, the flip-flops of FIGS. 19 and 20 are different in that the control terminals CK and /CK are exchanged.

The negative-edge triggered flip-flop of FIG. 20 performs toggling in response to the falling edges of the clock signal CLK whereas the positive-edge triggered flip-flop of FIG. 19 performs toggling in response to the rising edges of the clock signal CLK. When the clock signal CLK applied to the control terminal CK transitions to logic high, the second switch 98 is turned on and the data terminal D is set to logic level opposite to the non-inversion output terminal Q but the state of the flip-flop is not changed since the first switch 97 is turned off. When the clock signal CLK transitions to logic low, the first switch 97 is turned on and logic level of the inversion output terminal is applied to the input of the first inverter 95, thereby inverting the logic state of the non-inverting output terminal Q. As such, the negative-edge triggered flip-flop performs toggling by inverting the storage state from logic high to logic low or from logic low to logic high at each falling edge of the clock signal CLK applied to the control terminal CK.

Using the flip-flops as described with reference to FIGS. 19 and 20, the clocks of the above-described reference clock signal RCLK may be counted.

Figure 21:
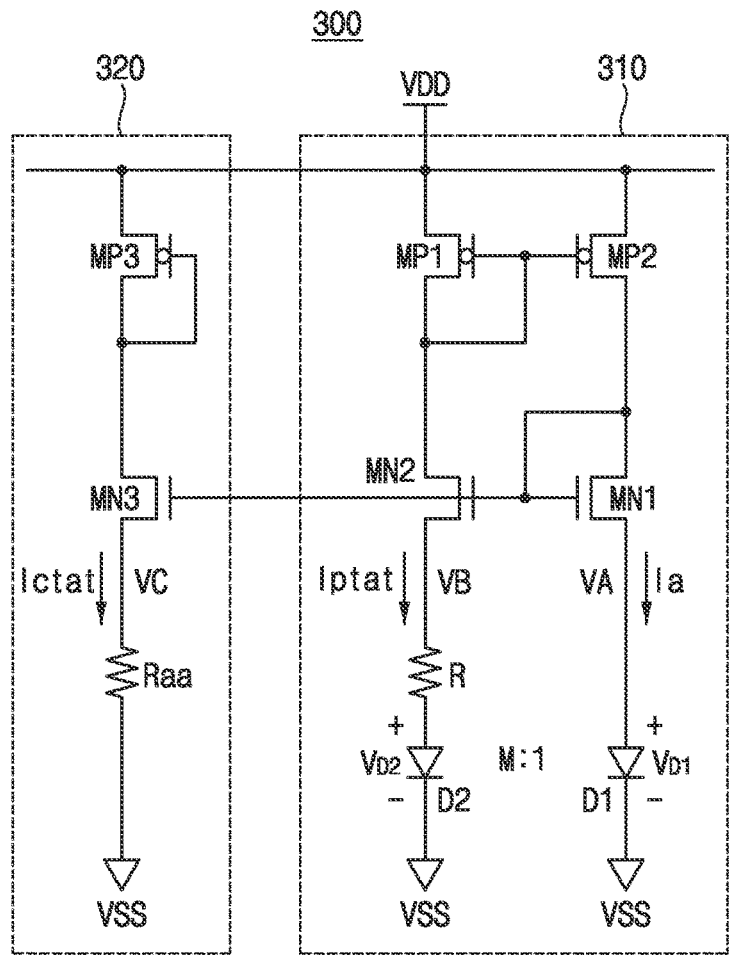
Figure 22:
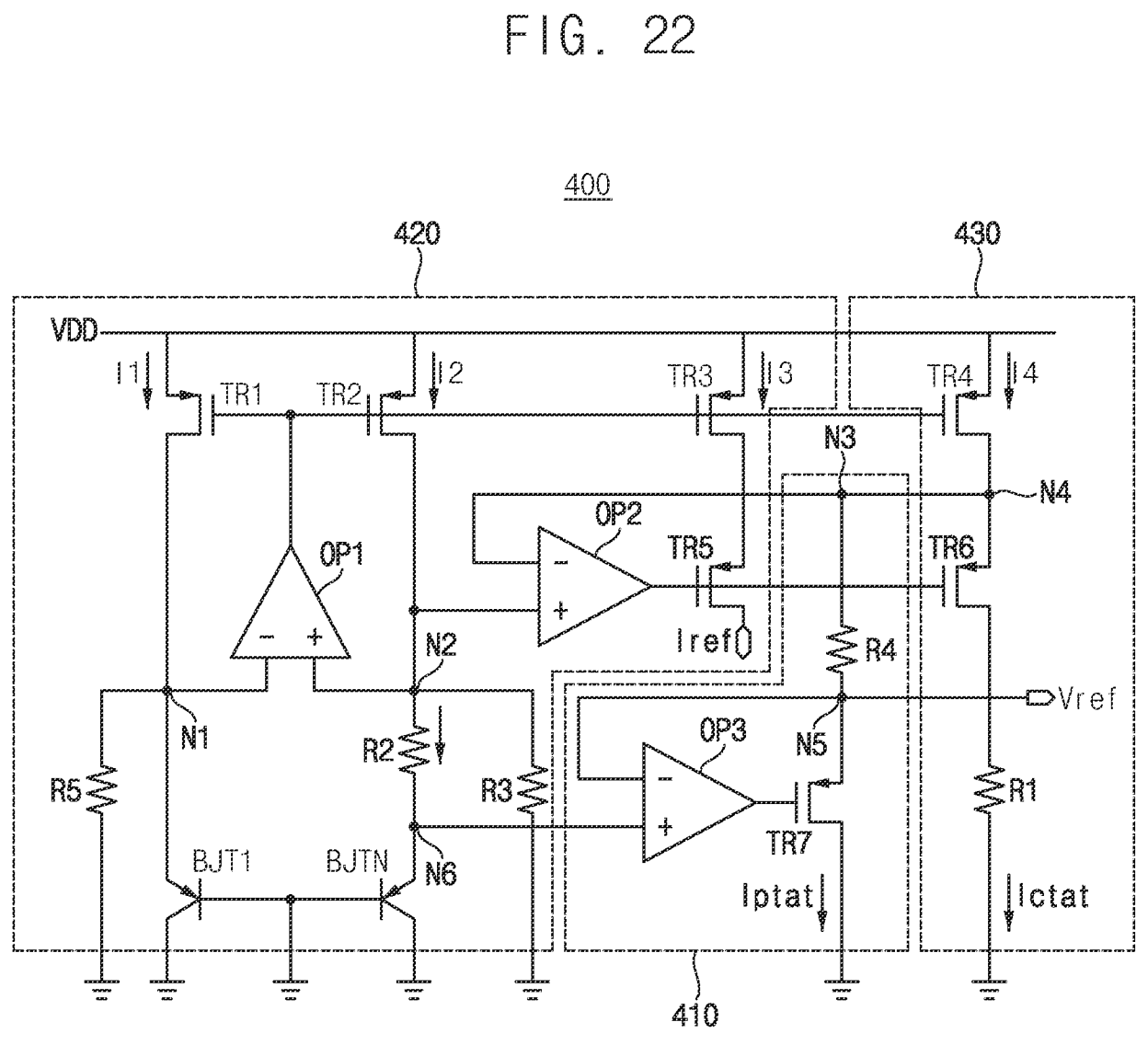

FIGS. 21 and 22 are circuit diagrams illustrating examples of a current generation circuit included in a digital temperature sensor according to some example embodiments.

Referring to FIG. 21, a current generation circuit 300 includes a proportional to absolute temperature current generator 310 (hereinafter referred to as a "PTAT current generator") and a complementary to absolute temperature current generator 320 (hereinafter referred to as "CTAT current generator").

The PTAT current generator 310 includes a first PMOS transistor MP1 and a second PMOS transistor MP2, a first NMOS transitory MN1 and a second NMOS transistor MN2, a resistor R, and a first diode D1 and a second diode D2. The first and second PMOS transistors MP1 and MP2 have the same size and constitute a first current mirror. The first and second NMOS transistors MN1 and MN2 have the same size and constitute a second current mirror. The sizes of the first diode D1 and the second diode D2 have a ratio of 1:M.

Since the first current mirror including the first and second PMOS transistors MP1 and MP2 and the second current mirror including the first and second NMOS transistors NM1 and MN2 are symmetrically connected to each other, the current Ia1 and the current Iptat are the same, that is, Ia1:Iptat=1:1.

The turn-on current ID of a diode is as shown in Expression 4.

$$ID = Is * \left( e^{\frac{VD}{VT}} - 1 \right) = Is * \left( e^{\frac{VD}{VT}} \right) \qquad \text{Expression 4}$$

In Expression 4, Is denotes the reverse saturation current of the diode, VD denotes the diode voltage, and VT denotes the temperature voltage represented by kT/q. Therefore, the current Ia1 flowing through the first diode D1 may be equal to Expression 5.

$$Ia1 = Is * \left( e^{\frac{VD1}{VT}} \right) \qquad \text{Expression 5}$$

Here, the first diode voltage VD1 is equal to Expression 6, and the second diode voltage VD2 is equal to Expression 7.

$$VD1 = VT * \ln\left( \frac{Ia1}{Is} \right) \qquad \text{Expression 6}$$

$$VD2 = VT * \ln(Ia2 / (Is * M)) \qquad \text{Expression 7}$$

Since the current Iptat (that is, the current Ia2) and the current Ia1 (that is, the current Ia) are equal, the first diode voltage VD1 and the current temperature voltage NOCO become almost equal, and the relationship of Expression 8 is established.

$$V(NCO0)=VD1=VD2"Ia2*R \qquad \text{Expression 8}$$

When Expressions 6 and 7 are substituted into Expression 8, the relationship of Expression 9 is established.

$$VT * \ln\left( \frac{Ia1}{Is} \right) = VT * \ln\left( \frac{Ia2}{Is * M} \right) + Ia2 * R \qquad \text{Expression 9}$$

Therefore, the current Ia2, that is, the current Iptat satisfies Expression 10, so the current Iptat is proportional to the operation temperature. That is, the PTAT current generation unit 210 generates a current (Ia2 or Iptat) proportional to the current temperature as Expression 10.

$$Ia2=VT*\ln(M)/R \qquad \text{Expression 10}$$

The CTAT current generator 220 includes a third PMOS transistor MP3, a third NMOS transistor MN3, and a resistor Raa.

The third NMOS transistor MN3 forms a current mirror with the first and second NMOS transistors MN1 and MN2. As mentioned above, the voltage VT increases with increasing temperature, but the current Is increases even more. Diode voltage has a characteristic of decreasing with temperature. Accordingly, the current Ictat flowing through the resistor Raa exhibits a characteristic of decreasing with temperature. That is, the CTAT current generator 220 generates a current inversely proportional to the operation temperature.

FIG. 22 illustrates an implementation example of the bandgap reference circuit 208 included in the frequency synthesis oscillator circuit 200 of FIG. 2, according to some example embodiments.

Unlike a related art RC oscillator using a reference resistor that is insensitive to temperature using a Proportional To Absolute Temperature (PTAT) resistor and a Complementary To Absolute Temperature (CTAT) resistor, the bandgap reference circuit 400 of FIG. 22 may use a method for cancelling a temperature coefficient of a PTAT/ CTAT resistor to generate a bandgap reference voltage Vref and a bandgap reference current Iref independent of temperature change. PTAT denotes a property that a resistance value of a resistor increases in proportion to temperature, and CTAT denotes a property that a resistance value of a resistor decreases in proportion to temperature. It is assumed that a first resistor R1, a second resistor R2, a third resistor R3, a fourth resistor R4 and a fifth resistor R5 included in the bandgap reference circuit 400 according to an example embodiment may be PTAT resistors having PTAT characteristics.

In some example embodiments, the bandgap reference circuit 400 includes a first NMOS transistor TR1 and a second NMOS transistor TR2, a first operational amplifier OP1, the second resistor R2 and the third resistor R3, and a reference current generating circuit 420 including a first Bipolar Junction Transistor (BJT) (BJT1) and an N BJT (BJTN). The N BJT (BJTN) may be referred to as a second BJT.

The first NMOS transistor TR1 may be connected in series between the first power voltage VDD and the first node N1 in series, and the second NMOS transistor TR2 may be connected between the first power voltage VDD and the second node N2 in series. The first NMOS transistor TR1 and the second NMOS transistor TR2 may serve to supply current to the first BJT BJT1 and the N BJT BJTN. The first NMOS transistor TR1 and the second NMOS transistor TR2 may be transistors having the same size. Here, the fact that one transistor has the same size as the other transistor means that the ratio (W/L) of the width and length of the channel region is the same between the two transistors. Accordingly, if two transistors having the same size have the same voltage applied to gate, source, and drain terminals, the same current may flow through the two transistors. The first operational amplifier OP1 may receive the voltage levels of the first node N1 and the second node N2 as input signals. An output terminal of the first operational amplifier OP1 may be commonly connected to a node between the gate terminal of the first NMOS transistor TR1 and the gate terminal of the second NMOS transistor TR2. The first BJT BJT1 may be connected in series between the first node N1 and the ground voltage. The N BJT BJTN may be configured by connecting N transistors BJTN1~BJTNN in parallel, or may be N (N is a positive integer greater than one) times the size of the first BJT BJT1. The N BJT BJTN may be connected in series between the second node N2 and the ground voltage.

When the voltages are expressed such that the voltage between the base-emitter terminal of the first BJT BJT1 is $V_{BE1}$, the voltage between the base-emitter terminal of the N BJT (BJTN) is $V_{BEN}$, and the voltage between the second node N2 and the emitter terminal of the N BJT BJTN is $\Delta V_{BE}$, the voltage $\Delta V_{BE}$ may be expressed as Expression 11.

$$\Delta V_{BE} = V_{BE1} - V_{BEN} \qquad \text{Expression 11}$$

In an example embodiment, $V_{BE1}$ is a CTAT voltage that decreases in proportion to temperature, and $\Delta V_{BE}$ is a PTAT voltage that increases in proportion to temperature. The base terminal of the first BJT BJT1 and the base terminal of the N BJT BJTN may be connected to the same node and may be connected to the ground voltage.

Accordingly, the current $I_{R2}$ flowing through the second resistor R2 may be determined according to the magnitude of $V_{BE}$ and corresponds to a PTAT current that increases in proportion to temperature. The current $I_{R2}$ flowing through the second resistor R2 may be expressed as in Expression 12.

$$I_{R2} = \frac{\Delta V_{BE}}{R_2} \qquad \text{Expression 12}$$

In an example embodiment, it may be assumed that the voltage levels of the first node N1 and the second node N2 are the same, and the current $I_{R5}$ flowing through the fifth resistor R5 and the current $I_{B3}$ flowing through the third resistor R3 corresponds to the CTAT current, which has a property of decreasing in proportion to temperature. The current $I_{B5}$ flowing through the fifth resistor R5 and the current $I_{R3}$ flowing through the third resistor R3 may be expressed by Expression 13 and Expression 14.

$$I_{R5} = \frac{V_{BE1}}{R_5} \qquad \text{Expression 13}$$

$$I_{R3} = \frac{V_{BE1}}{R_3} \qquad \text{Expression 14}$$

Referring to FIG. 22, the bandgap reference circuit 400 may include a current mirror composed of a first NMOS transistor TR1, a second NMOS transistor TR2, a third NMOS transistor TR3, and a fourth NMOS transistor TR4. Gate terminals of the first NMOS transistor TR1, the second NMOS transistor TR2, the third NMOS transistor TR3, and the fourth NMOS transistor TR4 may be connected to the same node. Accordingly, the following Expression 15 is established.

$$I_1 = I_2 = I_3 = I_4 \qquad \text{Expression 15}$$

Also, according to Kirchhoff's current law, the current $I_2$ flowing from the source terminal to the drain terminal of the second NMOS transistor TR2 is expressed by Expression 16.

$$I_2 = I_{R2} + I_{R2} = \frac{\Delta V_{BE}}{R_2} + \frac{V_{BE1}}{R_3} \qquad \text{Expression 16}$$

The second operational amplifier OP2 may receive the voltage levels of the second node N2 and the fourth node N4 as inputs. An output terminal of the second operational amplifier OP2 may be connected to a gate terminal of the fifth transistor TR5. The second operational amplifier OP2 may serve to output a stable voltage level in case the bandgap reference circuit 400 is in a power down state.

For example, the third NMOS transistor TR3 and the fifth NMOS transistor TR5 may be connected between the first power supply voltage VDD and a capacitor connected externally to the bandgap reference, and a bandgap reference current Iref insensitive to temperature change may be generated. The bandgap reference current Iref may be expressed as Expression 17.

$$I_{ref} = \frac{\Delta V_{BE}}{R_2} + \frac{V_{BE1}}{R_3} = : \frac{\alpha \Delta V_{BE} + \beta \Delta V_{BE1}}{R_0(1 + TC * f)} \qquad \text{Expression 17}$$

In Expression 17, TC denotes the temperature coefficient of resistance, and t denotes the absolute temperature value. In addition, Ro denotes a resistance value at an absolute temperature of OK, and constants $\alpha$ and $\beta$ denote arbitrary constants constituting the values of the second resistance R2 and the third resistance R3, respectively. Since $V_{BE}$ is the PTAT voltage and $V_{BE1}$ is the CTAT voltage, a bandgap reference current Iref constant at temperature may be generated by adjusting the constants $\alpha$ and $\beta$ (i.e., by adjusting the values of the resistors R2 and R3).

The bandgap reference circuit 400 may include a resistivity temperature coefficient cancellation circuit 410. According to an embodiment of the present disclosure, a bandgap reference current Iref and a bandgap reference voltage Vref independent of a temperature change may be generated by adding the resistivity temperature coefficient cancellation circuit 410.

The resistivity temperature coefficient cancellation circuit 410 may include a fourth resistor R4, a seventh transistor TR7, and a third operational amplifier OP3. The resistivity temperature coefficient cancellation circuit 410 may be disposed at the fourth node N4 of the bandgap reference circuit 400. Accordingly, the PTAT current Iptat is eliminated from the bandgap reference current Iref flowing from the source terminal to the drain terminal of the fourth NMOS transistor TR4, such that the CTAT current may flow through the fifth resistor R5 corresponding to the PTAT resistor.

The fourth resistor R4 may be connected in series between the third node N3 and the fifth node N5, and the seventh NMOS transistor TR7 may be connected in series between the fifth node N5 and the ground voltage. The third operational amplifier OP3 may receive the voltage of the fifth node N5 and the voltage of the emitter terminal of the N BJT BJTN as an input signal. An output terminal of the third operational amplifier OP3 may be connected to a gate terminal of the seventh transistor TR7. The third operational amplifier OP3 may serve to output a stable voltage level in case the bandgap reference circuit 400 is in a power down state.

The voltage of the third node N3 corresponds to $V_{BE1}$, and the voltage of the fifth node N5 corresponds to $V_{BEN}$. Accordingly, the voltage of the fourth resistor R4 becomes $\Delta V_{BE}$ corresponding to the PTAT voltage, and the current $I_{R4}$ flowing through the fourth resistor R4 may be expressed as Expression 18.

$$I_{R4} = \frac{\Delta V_{BE}}{R_4} = : I\_PTAT \qquad \text{Expression 18}$$

The current $I_{R4}$ flowing through the fourth resistor R4 corresponds to a PTAT current that increases in proportion to temperature, and thus may be referred to as a temperature proportional current I_PTAT.

The bandgap reference circuit 400 may include a reference voltage generator circuit 430 including a fourth NMOS transistor TR4, a sixth NMOS transistor TR6, and a first resistor R1.

The fourth NMOS transistor TR4 may be connected in series between the first power supply voltage VDD and the fourth node N4. The sixth NMOS transistor TR6 may be connected in series with the fourth NMOS transistor TR4, and a drain terminal of the fourth NMOS transistor TR4 may be connected to a source terminal of the sixth NMOS transistor TR6.

The voltage of the first resistor R1, that is, the bandgap reference voltage Vref, may be expressed by Expressions 19 and 20.

$$V_{ref} = (I_{ref} - I\_PTAT) * \qquad \text{Expression 19}$$
$$R_1 = : \frac{(\alpha - \gamma)\Delta V_{BE} + \beta V_{BE1}}{R_0(1 + TC * t)} * \zeta R_0(1 + TC * f)$$

$$I_{ref} - I_{PTAT} = I_{R1} = : I\_CTAT \qquad \text{Expression 20}$$

By adding the resistivity temperature coefficient cancellation circuit 410 to the third node N3, the bandgap reference current Iref flowing from the source terminal to the drain terminal of the fourth NMOS transistor TR4 is reduced by the PTAT current I_PTAT and the CTAT current I_CTAT, and as a result, the CTAT current I_CTAT flows through the first resistor R1. A current flowing through the first resistor R1 may be referred to as a current inversely proportional to temperature.

In Expression 19, TC denotes a temperature coefficient of resistance, and t denotes an absolute temperature value. In addition, Ro denotes a resistance value at an absolute temperature of OK, and the constant $\gamma$ and the constant $\zeta$ denote arbitrary constants constituting the values of the fourth resistance R4 and the first resistance R1, respectively. Since the current flowing through the first resistor R1 is the CTAT current and R1 is the PTAT resistor, the bandgap reference voltage Vref having a fixed level with temperature change may be generated by adjusting the constant $\gamma$ and the constant $\zeta$ (i.e., the values of the resistor R4 and the resistor R1).

Figure 23:
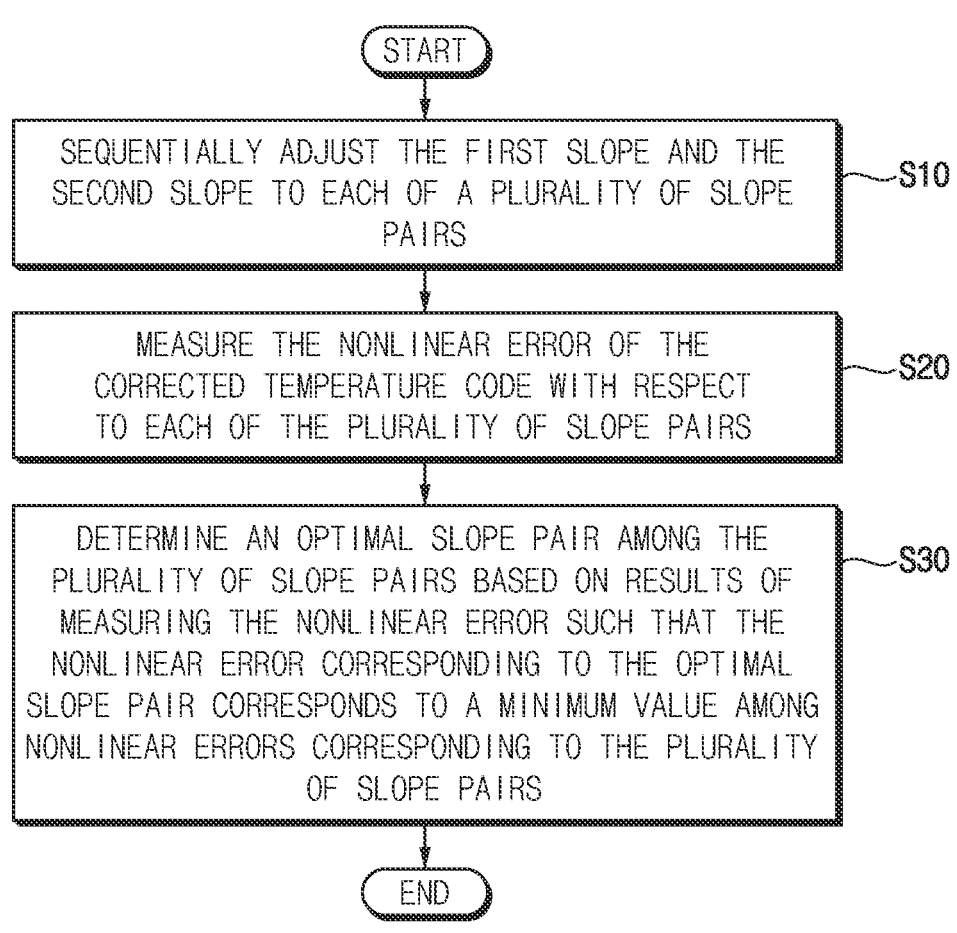
FIG. 23 is a flowchart illustrating a method of trimming a digital temperature sensor according to some embodiments.

FIG. 23 is a flowchart illustrating a method of trimming a digital temperature sensor according to some example embodiments.

The trimming method of the digital temperature sensor refers to optimizing the slope of the PTAT current Iptat and the CTAT current Ictat according to the operation temperature such that the nonlinear error of the correction temperature code TC is minimized.

Referring to FIG. 23, to optimize the slope of the PTAT current Iptat and the slope of the CTAT current Ictat, the first slope of the PTAT current Iptat and the second slope of the CTAT current Ictat may be sequentially adjusted to each of a plurality of slope pairs (S10).

A nonlinear error of the corrected temperature code TC may be measured with respect to each of the plurality of slope pairs (S20).

An optimal slope pair may be determined among the plurality of slope pairs based on results of measuring the nonlinear error such that the nonlinear error corresponding to the optimal slope pair corresponds to a minimum value among nonlinear errors corresponding to the plurality of slope pairs (S30).

Adjustment of the first slope of the PTAT current Iptat and the second slope of the CTAT current Ictat may be performed by adjusting the resistance value of the resistor, the size of the transistor, the size of the diode, etc. included in the current generating circuits 300 and 400 as described with reference to FIGS. 21 and 22. For example, the first slope of the PTAT current Iptat and the second slope of the CTAT current Ictat according to the operating temperature may be adjusted by implementing the corresponding component (e.g., resistors) in parallel configuration with a plurality of sub components and selecting at least a portion among the plurality of sub components.

Figure 24:
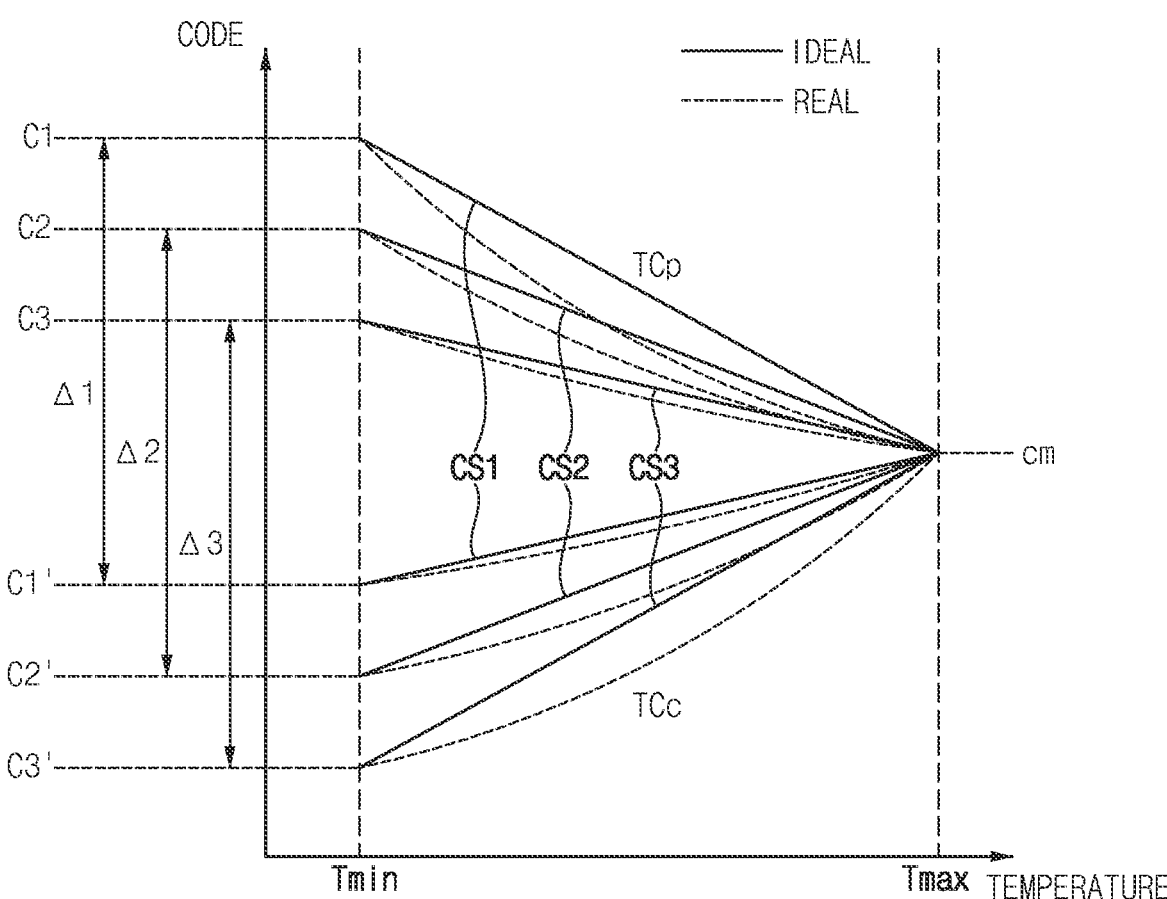
FIGS. 24 and 25 are diagrams for describing the method of FIG. 23, according to some embodiments.
Figure 25:
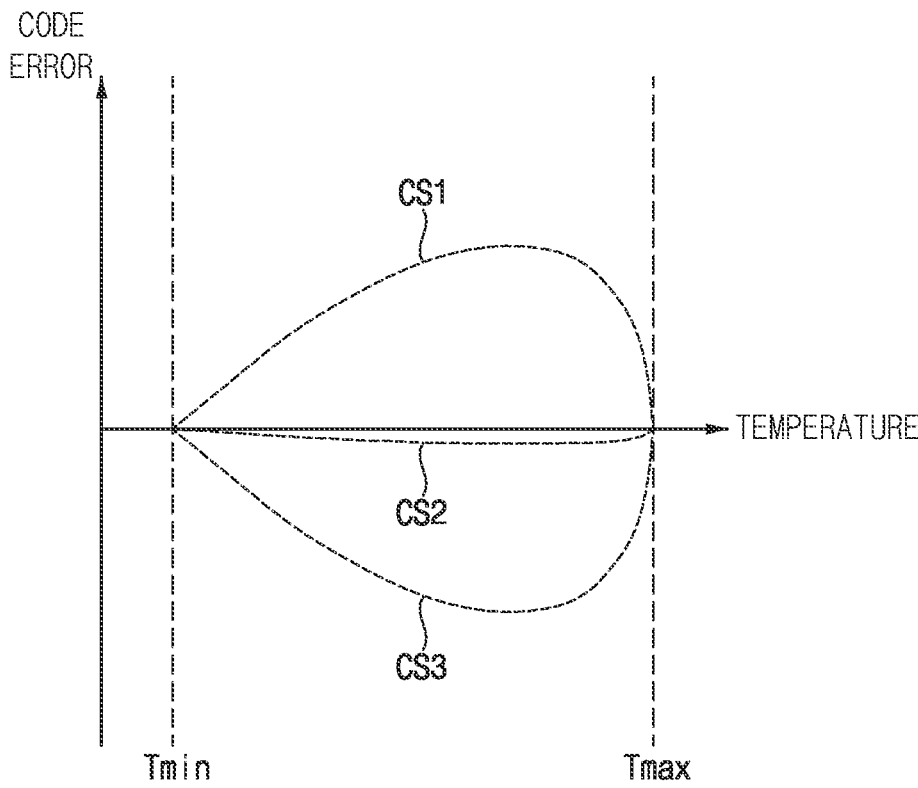

FIGS. 24 and 25 are diagrams for describing the method of FIG. 23, according to some example embodiments.

FIGS. 24 and 25 illustrates an example in which the plurality of slope pairs of FIG. 23 include a first slope pair CS1, a second slope pair CS2, and a third slope pair CS3. FIG. 24 illustrates the first temperature code TCp and the second temperature code TCc respectively corresponding to the first slope pair CS1, the second slope pair CS2, and the third slope pair CS3, FIG. 25 illustrates the nonlinear errors of the corrected temperature codes TC respectively corresponding to the first slope pair CS1, the second slope pair CS2, and the third slope pair CS3. FIG. 24 shows an example in which the first temperature code TCp and the second temperature code TCc at the maximum temperature Tmax are set to the same value cm, but example embodiments are not limited thereto. According to example embodiments, the first temperature code TCp and the second temperature code TCc at the maximum temperature Tmax may be different from each other.

In the example of FIGS. 24 and 25, the code error, that is, the nonlinear error corresponding to the second slope pair CS2 is smaller than the nonlinear error corresponding to the first slope pair CS1 and the nonlinear error corresponding to the third slope pair CS3. Accordingly, the performance of the digital temperature sensor may be optimized by determining parameters or characteristic values of the current generating circuit to correspond to the second slope pair CS2.

Meanwhile, in order to implement the target resolution of the correction temperature code TC, the value of the first temperature code TCp and the value of the second temperature code TCc at the minimum temperature Tmin may be set to the same value. In other words, the first slope pair CS1, the second slope pair CS2, and the third slope pair CS3 may be adjusted to satisfy $\Delta 1 = C1 - C1'$, $\Delta 2 = C2 - C2'$, and $\Delta 3 = C3 - C3'$.

Figure 26:
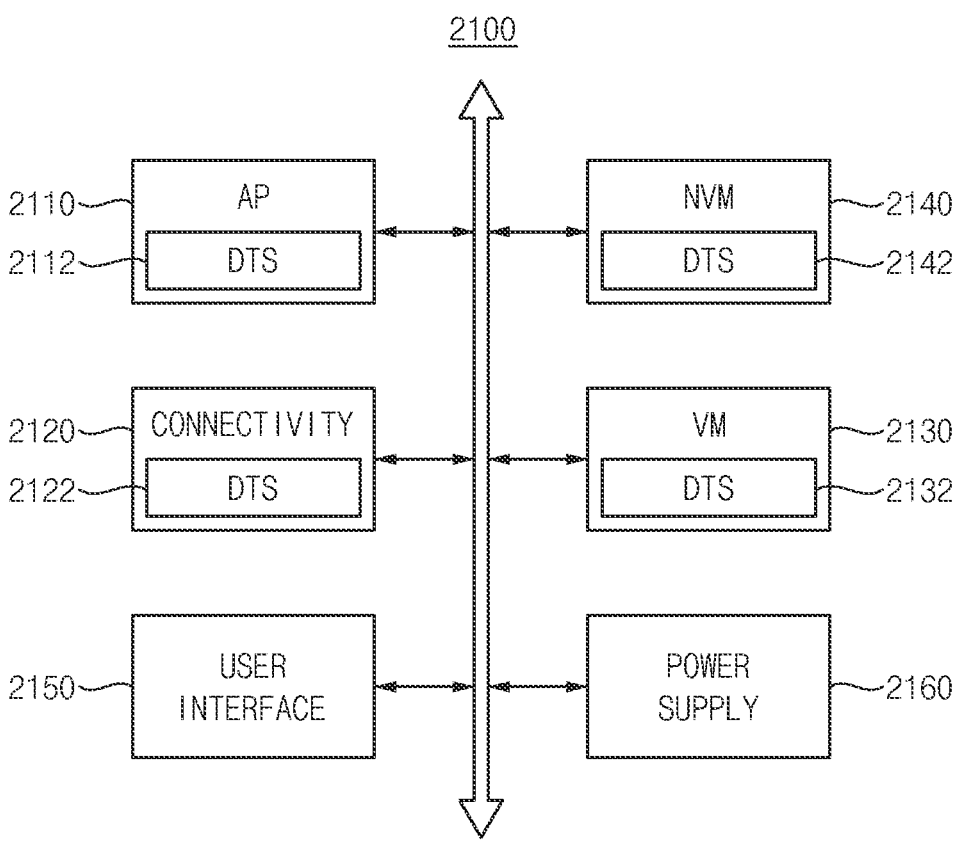
FIG. 26 is a block diagram illustrating a semiconductor device including a digital temperature sensor according to some embodiments.

FIG. 26 is a block diagram illustrating a semiconductor device including a digital temperature sensor according to some example embodiments.

Referring to FIG. 26, a semiconductor device 2100 includes an application processor (AP) 2110, a connectivity circuit (CONNECTIVITY) 2120, a volatile memory device (VM) 2130, a nonvolatile memory device (NVM) 2140, a user interface 2150, and a power supply 2160. According to example embodiments, the semiconductor device 2100 may include any mobile system such as a mobile phone, a smart phone, a personal digital assistant (PDA), a portable multimedia player (PMP), a digital camera, a music player, a portable game console, a navigation system, and so on.

The application processor (AP) 2110 may execute applications to provide an Internet browser, a game, or a moving picture. According to example embodiments, the application processor 2110 may include a single core or multi-cores. For example, the application processor 2110 may include multi-cores such as a dual-core, a quad-core, and a hexa-core. In addition, according to example embodiments, the application processor 2110 may include an internal cache memory or an external cache memory.

The connectivity circuit (CONNECTIVITY) 2120 may perform wireless communication or wired communication with an external device. For example, the connectivity circuit 2120 may perform Ethernet communication, near field Communication (NFC), radio frequency identification; (RFID) communication, mobile telecommunication, memory card communication, or universal serial bus (USB)

communication. For example, the connectivity circuit 2120 may include a baseband chipset, and may support communication such as GSM, GPRS, WCDMA, or HSxPA.

The volatile memory device (VM) 2130 may store data processed by the application processor 2110 or may operate as a working memory. For example, the volatile memory device 2130 may be implemented in the form of a dynamic random access memory (DRAM), a static random access memory (SRAM), a mobile DRAM, a DDR SDRAM, an LPDDR SDRAM, a GDDR SDRAM, a RDRAM, or a memory similar thereto.

The nonvolatile memory device (NVM) 2140 may store a boot image used to boot the semiconductor device 2100. For example, the nonvolatile memory device 2140 may be implemented in the form of an electrically erasable programmable read-only memory (EEPROM), a flash memory, a phase change random access memory (PRAM), an resistance value random access memory (RRAM), a nano-floating gate memory (NFGM), a polymer random access memory (PoRAM), a magnetic random access memory (MRAM), a ferroelectric random access memory (FRAM) or a memory similar thereto.

The application processor 2110, the connectivity circuit 2120, the volatile memory device 2130, and the nonvolatile memory device 2140 may include digital temperature sensors (DTS) 2112, 2122, 2132, and 2142, respectively, according to various example embodiments discussed with respect to FIGS. 1-25. As described above, the digital temperature sensors 2112, 2122, 2132, and 2142 may provide exact temperature information by cancelling the nonlinear error of the first temperature code TCp according to the PTAT characteristics and the nonlinear error of the second temperature code TCc according to the CTAT characteristics.

The user interface 2150 may include at least one input device such as a keypad or a touch screen, and/or at least one output device such as a speaker or a display device. The power supply 2160 may supply the operation voltage of the semiconductor device 2100. In addition, according to example embodiments, the semiconductor device 2100 may further a camera image processor (CIS), and may further include a storage device such as a memory card, a solid state drive (SSD), a hard disk drive (HDD), or a CD-ROM.

The semiconductor device 2100 or the components of the semiconductor device 2100 may be mounted by using various types of packages. For example, the semiconductor device 2100 or the components of the semiconductor device 2100 may be mounted by using a package such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat-pack (TQFP), small outline integrated circuit (SOIC), shrink small outline package (SSOP), thin small outline package (TSOP), thin quad flat-pack (TQFP), system in package (SIP), multi-chip package (MCP), wafer-level fabricated package (WFP), or wafer-level processed stack package (WSP).

Example embodiments may be applied to any electronic devices and systems requiring the temperature information. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A digital temperature sensor comprising:
a current generation circuit configured to generate a proportional to absolute temperature (PTAT) current that is proportional to an operation temperature and generate a complementary to absolute temperature (CTAT) current that is inversely proportional to the operation temperature;
an oscillation circuit configured to generate a first clock signal having a first cyclic period based on the PTAT current such that the first cyclic period is inversely proportional to the PTAT current and generate a second clock signal having a second cyclic period based on the CTAT current such that the second cyclic period is inversely proportional to the CTAT current;
a conversion circuit configured to generate a first temperature code based on the first clock signal such that the first temperature code decreases as the operation temperature increases and generate a second temperature code based on the second clock signal such that the second temperature code increases as the operation temperature increases; and
a calculation circuit configured to calculate a difference between the first temperature code and the second temperature code and generate a corrected temperature code based on the difference.

2. The digital temperature sensor of claim 1, wherein the oscillation circuit includes:
at least one current-controlled oscillator configured to generate the first clock signal and the second clock signal based on the PTAT current and the CTAT current.

3. The digital temperature sensor of claim 1, wherein the conversion circuit includes:
at least one clock counter configured to receive a reference clock signal having a reference cyclic period that is fixed regardless of the operation temperature, count first clocks of the reference clock signal during a first counting time interval that is proportional to the first cyclic period, count second clocks of the reference clock signal during a second counting time interval that is proportional to the second cyclic period, and generate the first temperature code based on the first clocks and the second temperature code based on the second clocks.

4. The digital temperature sensor of claim 3, wherein the current generation circuit is a bandgap reference circuit configured to generate a reference current that is fixed regardless of the operation temperature, the PTAT current, and the CTAT current, and the oscillation circuit generates the reference clock signal based on the reference current.

5. The digital temperature sensor of claim 1, wherein the calculation circuit generates the corrected temperature code by subtracting the second temperature code from the first temperature code such that the corrected temperature code decreases as the operation temperature decreases.

6. The digital temperature sensor of claim 1, wherein the digital temperature sensor generates the corrected temperature code by cancelling a nonlinear error of the first temperature code and a nonlinear error of the second temperature code such that a nonlinear error of the corrected temperature code is less than each of the nonlinear error of the first temperature code and the nonlinear error of the second temperature code.

7. The digital temperature sensor of claim 1, wherein the oscillation circuit includes:
a common current-controlled oscillator configured to sequentially generate the first clock signal and the second clock signal respectively based on the PTAT current and the CTAT current, and
wherein the conversion circuit includes:
a common time-to-digital converter configured to sequentially generate the first temperature code and the second temperature code respectively based on the first clock signal and the second clock signal.

8. The digital temperature sensor of claim 1, wherein the oscillation circuit includes:
a current selection circuit configured to receive the PTAT current and the CTAT current and generate a selection current that includes the PTAT current during a first sensing period and includes the CTAT current during a second sensing period; and
a common current-controlled oscillator configured to generate a selection clock signal based on the selection current such that the selection clock signal includes the first clock signal during the first sensing period and includes the second clock signal during the second sensing period.

9. The digital temperature sensor of claim 8, wherein the conversion circuit includes:
a common time-to-digital converter configured to, based on the selection clock signal, measure the first cyclic period during the first sensing period and generate the first temperature code based on the measured first cyclic period and measure the second cyclic period during the second sensing period and generate the second temperature code based on the measured second cyclic period.

10. The digital temperature sensor of claim 9, wherein the common time-to-digital converter includes:
an enable circuit configured to generate a counting enable signal based on counting clocks of the selection clock signal by a reference number during the first sensing period and based on counting clocks of the selection clock signal by the reference number during the second sensing period such that a first activation time interval of the counting enable signal during the first sensing period corresponds to a first counting time interval that is proportional to the first cyclic period and a second activation time interval of the counting enable signal during the second sensing period corresponds to a second counting time interval that is proportional to the second cyclic period; and
a clock counter configured to receive a reference clock signal having a reference cyclic period that is fixed regardless of the operation temperature, count first clocks of the reference clock signal during the first counting time interval based on the counting enable signal and generate the first temperature code based on the first clocks, and count second clocks of the reference clock signal during the second counting time interval based on the counting enable signal and generate the second temperature code based on the second clocks.

11. The digital temperature sensor of claim 1, wherein the oscillation circuit includes:
a first current-controlled oscillator configured to generate the first clock signal based on the PTAT current; and
a second current-controlled oscillator configured to generate the second clock signal based on the CTAT current, and
wherein the conversion circuit includes:
a first time-to-digital converter configured to generate the first temperature code based on the first clock signal; and
a second time-to-digital converter configured to generate the second temperature code based on the second clock signal.

12. The digital temperature sensor of claim 11, wherein the first time-to-digital converter includes:
a first enable circuit configured to count first clocks of the first clock signal by a reference number and generate a first counting enable signal based on the first clocks such that a first activation time interval of the first counting enable signal corresponds to a first counting time interval that is proportional to the first cyclic period; and
a first clock counter configured to receive a reference clock signal having a reference cyclic period that is fixed regardless of the operation temperature, count second clocks of the reference clock signal during the first counting time interval based on the first counting enable signal, and generate the first temperature code based on the second clocks, and
wherein the second time-to-digital converter includes:
a second enable circuit configured to count third clocks of the second clock signal by the reference number and generate a second counting enable signal based on the third clocks such that a second activation time interval of the second counting enable signal corresponds to a second counting time interval that is proportional to the second cyclic period; and
a second clock counter configured to receive the reference clock signal, count fourth clocks of the reference clock signal during the second counting time interval based on the second counting enable signal and generate the second temperature code based on the fourth clocks.

13. A digital temperature sensor comprising:
a current generation circuit configured to generate a proportional to absolute temperature (PTAT)current that is proportional to an operation temperature, generate a complementary to absolute temperature (CTAT) current that is inversely proportional to the operation temperature, and generate a reference current that is fixed regardless of the operation temperature;
an oscillation circuit configured to generate a first clock signal having a first cyclic period based on the PTAT current, generate a second clock signal having a second cyclic period based on the CTAT current, and generate a reference clock signal having a reference cyclic period based on the reference current such that the first cyclic period is inversely proportional to the PTAT current, the second cyclic period is inversely proportional to the CTAT current, and the reference cyclic period is fixed regardless of the operation temperature;
a conversion circuit configured to generate a first temperature code and a second temperature code based on the first clock signal, the second clock signal and the reference clock signal such that the first temperature code decreases as the operation temperature increases and the second temperature code increases as the operation temperature increases; and
a calculation circuit configured to calculate a difference between the first temperature code and the second temperature code and generate a corrected temperature code based on the difference, such that the corrected temperature code decreases as the operation temperature decreases.

14. The digital temperature sensor of claim 13, wherein the oscillation circuit includes:
a common current-controlled oscillator configured to sequentially generate the first clock signal and the second clock signal respectively based on the PTAT current and the CTAT current, and
a reference current-controlled oscillator configured to generate the reference clock signal based on the reference current.

15. The digital temperature sensor of claim 14, wherein the conversion circuit includes:
a common time-to-digital converter configured to sequentially generate the first temperature code and the second temperature code respectively based on the first clock signal and the second clock signal.

16. The digital temperature sensor of claim 13, wherein the oscillation circuit includes:
a first current-controlled oscillator configured to generate the first clock signal based on the PTAT current;
a second current-controlled oscillator configured to generate the second clock signal based on the CTAT current; and
a reference current-controlled oscillator configured to generate the reference clock signal based on the reference current.

17. The digital temperature sensor of claim 16, wherein the conversion circuit includes:
a first time-to-digital converter configured to count first clocks of the reference clock signal based on the first clock signal and generate the first temperature code based on the first clocks; and
a second time-to-digital converter configured to count second clocks of the reference clock signal based on the second clock signal and generate the second temperature code based on the second clocks.

18. A method comprising:
generating a proportional to absolute temperature (PTAT) current that is proportional to an operation temperature;
generating a complementary to absolute temperature (CTAT)current that is inversely proportional to the operation temperature;
generating a first clock signal having a first cyclic period based on the PTAT current such that the first cyclic period is inversely proportional to the PTAT current;
generating a second clock signal having a second cyclic period based on the CTAT current such that the second cyclic period is inversely proportional to the CTAT current;
generating a first temperature code based on the first clock signal such that the first temperature code decreases as the operation temperature increases;
generating a second temperature code based on the second clock signal such that the second temperature code increases as the operation temperature increases;
calculating a difference between the first temperature code and the second temperature code; and generating a corrected temperature code based on the difference.

19. The method of claim 18, further comprising:

optimizing a first slope of the PTAT current according to the operation temperature and a second slope of the CTAT current according to the operation temperature such that a nonlinear error of the corrected temperature code is minimized.

20. The method of claim 18, wherein optimizing the first slope of the PTAT current and the second slope of the CTAT current includes:

sequentially adjusting the first slope and the second slope to each of a plurality of slope pairs;

measuring a nonlinear error of the corrected temperature code with respect to each of the plurality of slope pairs; and determining an optimal slope pair among the plurality of slope pairs a minimum value of the nonlinear error among the nonlinear errors corresponding to the plurality of slope pairs.

* * * * *